(12) United States Patent
Chang et al.

(10) Patent No.: US 9,081,232 B2
(45) Date of Patent: Jul. 14, 2015

(54) DISPLAY PANEL AND METHOD FOR MANUFACTURING THE SAME

(71) Applicant: Samsung Display Co., Ltd., Yongin, Gyeonggi-do (KR)

(72) Inventors: Hak-Sun Chang, Yongin-Si (KR); Jang-Wi Ryu, Seoul (KR); Gak-Seok Lee, Busan (KR); Jun-Woo Lee, Gyeonggi-do (KR); Hee-Hwan Lee, Seoul (KR); Hyo-Ju Jung, Incheon (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 155 days.

(21) Appl. No.: 13/710,943

(22) Filed: Dec. 11, 2012

(65) Prior Publication Data

US 2013/0242245 A1  Sep. 19, 2013

(30) Foreign Application Priority Data

Mar. 19, 2012  (KR) .......................... 10-2012-0027954

(51) Int. Cl.
*G02F 1/1337* (2006.01)
*G02F 1/139* (2006.01)

(52) U.S. Cl.
CPC ........ *G02F 1/133753* (2013.01); *G02F 1/1395* (2013.01); *G02F 1/133788* (2013.01); *G02F 2001/133757* (2013.01)

(58) Field of Classification Search
CPC ................................................ G02F 1/133753
USPC ....... 349/128, 129; 445/24; 438/30; 428/192; 257/E33.012
See application file for complete search history.

(56) References Cited

U.S. PATENT DOCUMENTS

| | | | |
|---|---|---|---|
| 5,831,706 A * | 11/1998 | Lyu ............................... | 349/129 |
| 2004/0201806 A1* | 10/2004 | Choo et al. ..................... | 349/129 |
| 2005/0157239 A1* | 7/2005 | Yoo ............................... | 349/141 |
| 2010/0157223 A1* | 6/2010 | Shin et al. ...................... | 349/129 |
| 2011/0261295 A1* | 10/2011 | Kim ............................... | 349/96 |
| 2011/0261307 A1* | 10/2011 | Shin et al. ...................... | 349/123 |
| 2012/0026439 A1* | 2/2012 | Jung et al. ...................... | 349/110 |
| 2013/0050625 A1* | 2/2013 | Jung et al. ...................... | 349/128 |

* cited by examiner

*Primary Examiner* — Sang V Nguyen
(74) *Attorney, Agent, or Firm* — F. Chau & Associates, LLC

(57) ABSTRACT

A display panel includes a gate line, a data line, a pixel electrode formed adjacent to the gate and data lines on a lower substrate and a first alignment film disposed in a first domain disposed on the pixel electrode and in a second domain formed on pixel electrode. The first domain is aligned in a first direction and the second domain is aligned in a second direction which is different from the first direction. The upper substrate opposes the lower substrate and includes a common electrode disposed on the upper substrate and a second alignment film disposed on the common electrode at a third domain corresponding to the first domain and at a fourth domain corresponding to the second domain. The liquid crystal layer is disposed between the lower substrate and the upper substrate and includes liquid crystals defined by a plurality of pixel areas.

26 Claims, 19 Drawing Sheets

LEFT ←——→ RIGHT

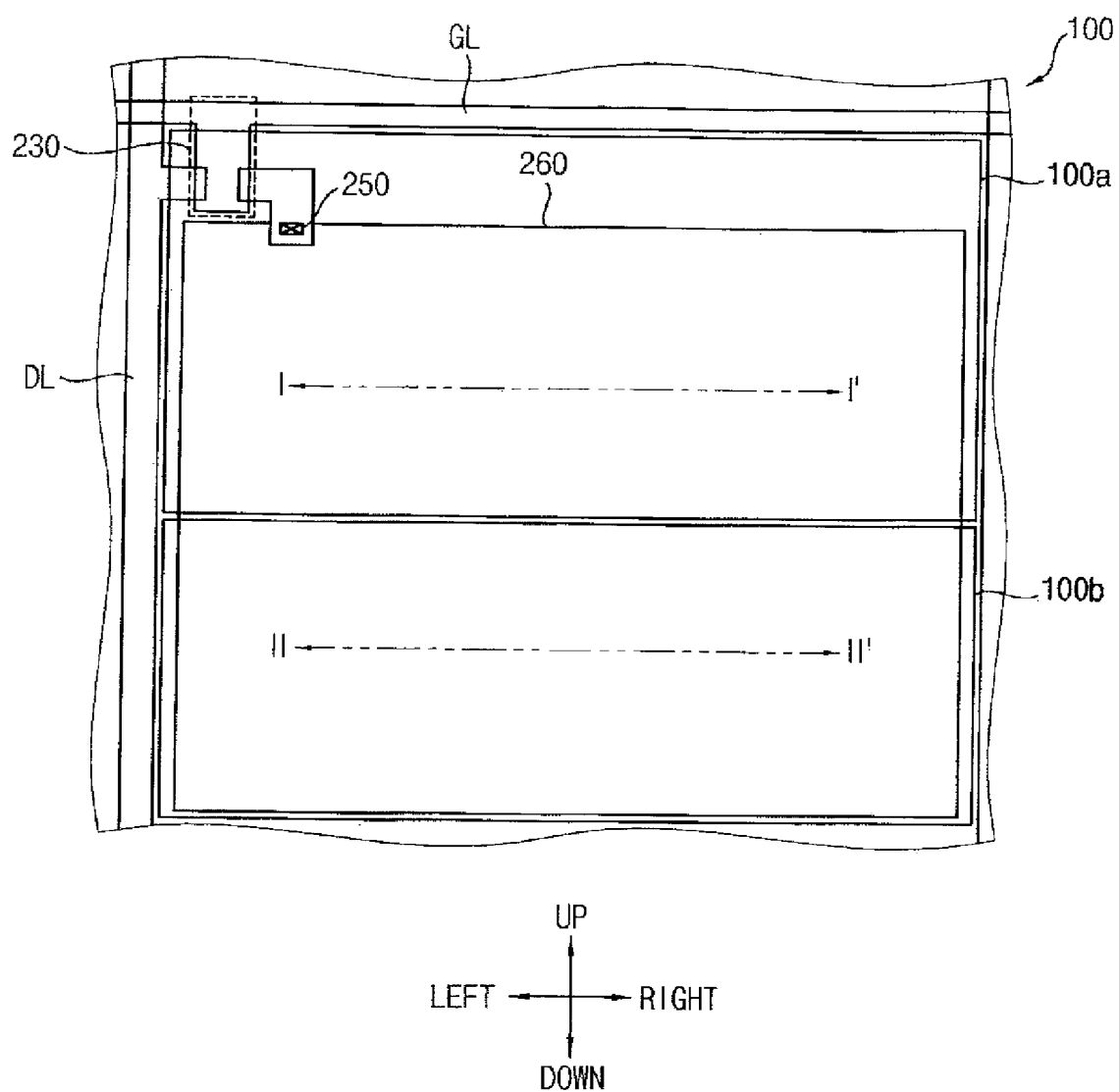

FIG. 7
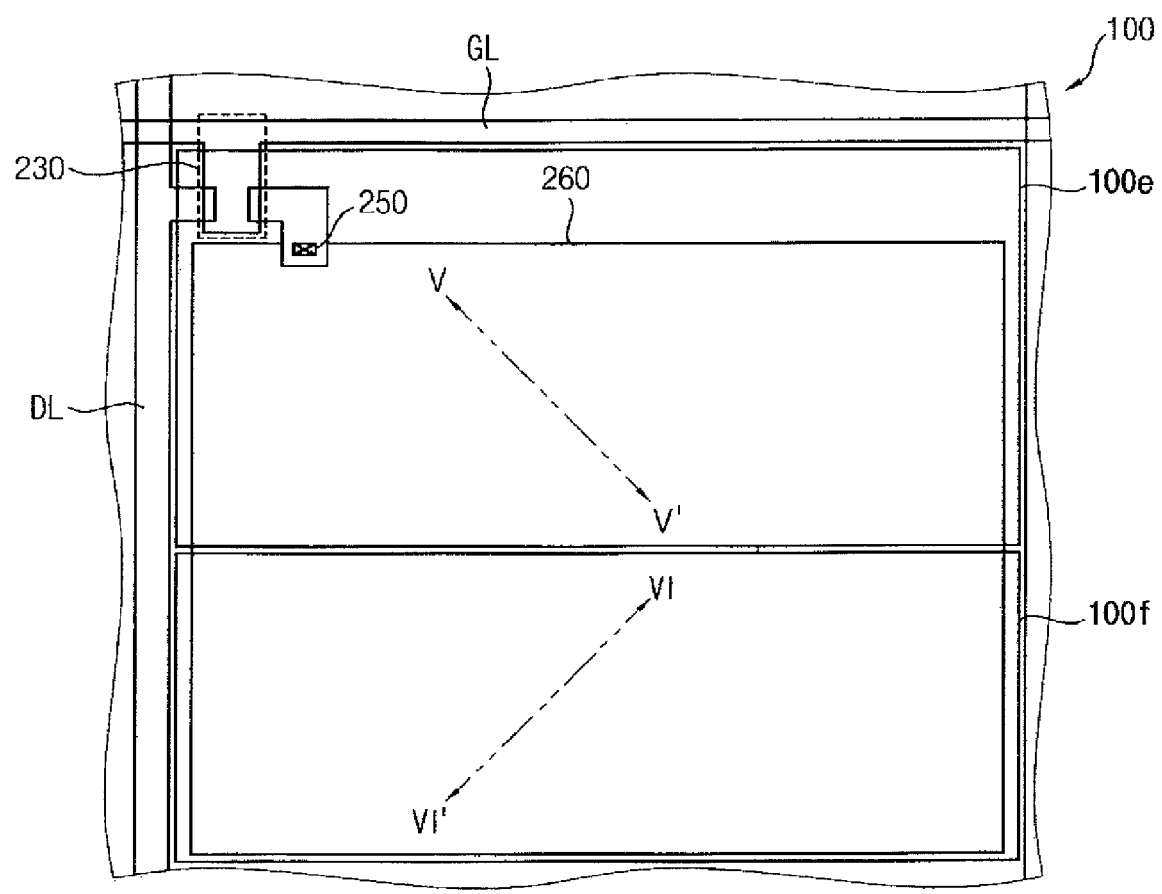
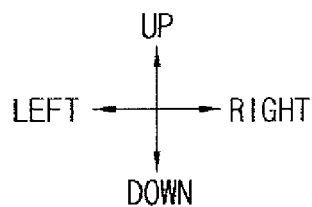

LEFT-UP ← → RIGHT-DOWN

RIGHT-UP ← → LEFT-DOWN

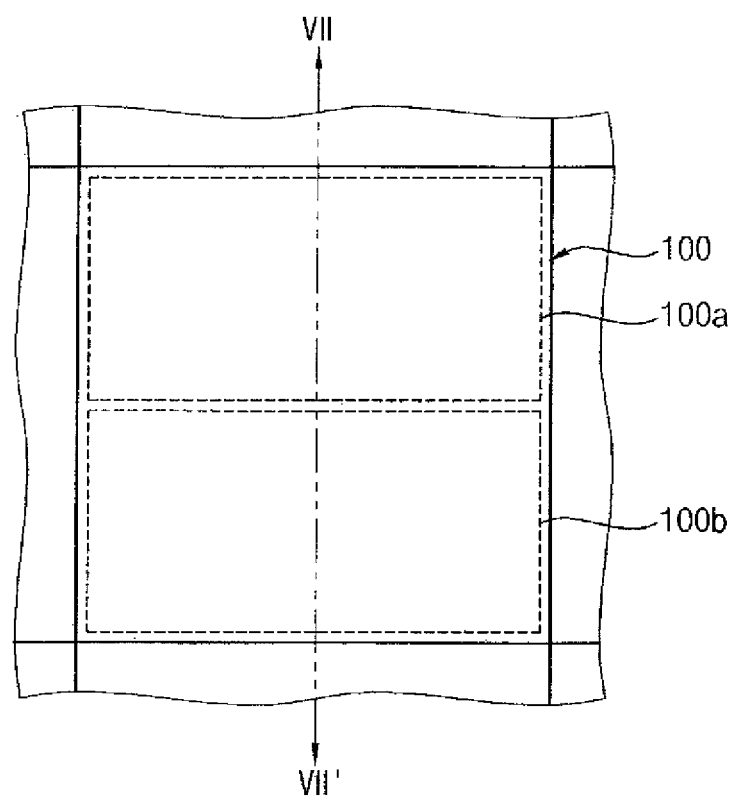

DISPLAY PANEL AND METHOD FOR MANUFACTURING THE SAME

CROSS-REFERENCE TO RELATED APPLICATION

This application claims priority under 35 U.S.C. §119 to Korean Patent Application No. 10-2012-0027954, filed on Mar. 19, 2012, the disclosure of which is hereby incorporated by reference in its entirety.

1. TECHNICAL FIELD

The present disclosure relates to a display panel and a method for manufacturing the same. More particularly, the present disclosure relates to a display panel and a method for manufacturing the same.

2. DISCUSSION OF THE RELATED ART

A liquid crystal display apparatus includes a lower substrate, an upper substrate and a liquid crystal layer between the lower substrate and the upper substrate. To display an image, an alignment of liquid crystal in the liquid crystal layer is controlled. Alignment layers may be formed at the upper substrate and the lower substrate.

The alignment modes of the liquid crystal includes, for example, a twisted nematic (TN) mode, an in plane switching (IPS) mode with a plain electrical field, a vertical alignment (VA) mode with a vertical electrical field, an optically compensated bend (OCB) mode and so on. In the OCB mode, the nematic liquid crystal is used like the TN mode. In the OCB mode, the liquid crystal is aligned to form a self compensation in the liquid crystal layer, so that the OCB mode may implement a wider view angle. Moreover, the OCB mode may have the fastest response time among the nematic liquid crystal modes.

In the OCB mode, the alignment direction of the upper substrate may be the same as the alignment direction of the lower substrate. Thus, the bend direction of the liquid crystal may be different from the change direction in the vertical direction. The difference between the bend direction of the liquid crystal and the change direction in the vertical direction may change the viewing angle and the amount of the color reproduced according the position of the viewer and the image may be displayed differently according to the position.

Moreover, in the OCB mode, the alignment direction is about 90 degrees because the asymmetry of the view angle. To form the 90 degrees alignment direction, a polarizing sheet in which the polarizing angle is, for example, between about 45 to about 135 degrees should be used. A display apparatus including a polarizing sheet having a polarizing angle between about 45 to about 135 degrees maybe difficult to manufacture.

SUMMARY

Exemplary embodiments of the invention provide a display panel including various light alignments.

Exemplary embodiments of the invention provide a method for manufacturing the display panel.

According to an exemplary embodiment of the invention, a display panel includes a lower substrate and an upper substrate and a liquid crystal layer. The lower substrate includes a gate line, a data line, a pixel electrode formed adjacent to the gate and data lines on the lower substrate and a first alignment film disposed in a first domain disposed on the pixel electrode and in a second domain formed on pixel electrode. The first domain is aligned in a first direction and the second domain is aligned in a second direction which is different from the first direction. The upper substrate opposes the lower substrate and includes a common electrode disposed on the upper substrate and a second alignment film disposed on the common electrode at a third domain corresponding to the first domain and at a fourth domain corresponding to the second domain. The third domain is aligned in the first direction and the fourth domain is aligned in the second direction. The liquid crystal layer is disposed between the lower substrate and the upper substrate and includes liquid crystals defined by a plurality of pixel areas. The liquid crystals are aligned by the first alignment film and the second alignment film.

In an exemplary embodiment, the first domain and the second domain may correspond to a pixel area of the liquid crystal layer, and the third domain and the fourth domain may correspond to the pixel area of the liquid crystal layer.

In an exemplary embodiment, the pixel area of the liquid crystal layer may be divided into the first domain and the second domain, and the first domain is disposed above the second domain, and the pixel area of the liquid crystal layer may be divided into the third domain and the fourth domain, and the third domain is disposed above the fourth domain.

In an exemplary embodiment, the pixel area of the liquid crystal may be divided into the first domain and the second domain, and the first domain is disposed at a left side to the second domain, and the pixel area of the liquid crystal layer may be divided into the third domain and the fourth domain, and the third domain is disposed at a left side to the fourth domain.

In an exemplary embodiment, the second direction may be substantially the opposite direction to the first direction.

In an exemplary embodiment, the first direction may be substantially the same direction as an extension direction of the gate line.

In an exemplary embodiment, the first direction may be substantially the same direction as an extension direction of the data line.

In an exemplary embodiment, the first direction may be substantially perpendicular to the second direction.

In an exemplary embodiment, the first direction may be inclined at about 45 degrees with respect to an extension direction of the gate line.

In an exemplary embodiment, the first direction may be inclined at about 45 degrees with respect to an extension direction of the data line.

According to an exemplary embodiment of the invention, a method for manufacturing a display panel is provided. The method includes forming a lower substrate by forming a gate line, a data line and a pixel electrode formed adjacent to the gate line and data line on a first base substrate, forming a first alignment film on a first domain and a second domain of a pixel area disposed on the pixel electrode of the lower substrate, forming alignments at the first domain in a first direction and at the second domain in a second direction which is different from the first direction, forming an upper substrate by forming a common electrode on a second base substrate, forming a second alignment film on the common electrode of the lower substrate at third domain corresponding to the first domain and at a fourth domain corresponding to the second domain, forming alignments at the third domain in the first direction and at the fourth domain in the second direction and forming a liquid crystal layer between the lower substrate and the upper substrate.

In an exemplary embodiment, the second direction may be substantially the opposite direction of the first direction.

In an exemplary embodiment, the step for forming the alignments at the first domain in a first direction and at the second domain in the second direction may include scanning light on the first alignment film in the first direction by using a first mask exposing the first domain and scanning light on the first alignment film in the second direction by using a second mask exposing the second domain.

In an exemplary embodiment, the step for forming the alignments at the third domain in the first direction and at the fourth domain in the second direction may include scanning light on the second alignment film in the first direction by using a third mask exposing the third domain and scanning light on the second alignment film in the second direction by using a fourth mask exposing the fourth domain.

In an exemplary embodiment, the first direction may be substantially the same direction as an extension direction of the gate line.

In an exemplary embodiment, the first direction may be substantially the same direction as an extension direction of the data line.

In an exemplary embodiment, the first direction may be substantially perpendicular to the second direction.

In an exemplary embodiment, the step for forming the alignments at the first domain in a first direction and at the second domain in the second direction may include scanning light on the first alignment film in a third direction by using a first mask exposing the first domain and scanning light on the first alignment film in a fourth direction which is substantially opposite to the third direction by using a second mask exposing the second domain, and scanning light on the first alignment film in a fifth direction which is substantially perpendicular to the third and fourth directions.

In an exemplary embodiment, the step for forming the alignments at the third domain in the first direction and at the fourth domain in the second direction may include scanning light on the second alignment film in a third direction by using a third mask exposing the third domain, scanning light on the second alignment film in a fourth direction which is substantially opposite to the third direction by using a fourth mask exposing the fourth domain and scanning light on the first alignment film in a fifth direction which is substantially perpendicular to the third and fourth directions.

In an exemplary embodiment, the first direction may be inclined at about 45 degrees with respect to an extension direction of the gate line.

In an exemplary embodiment, the first direction may be inclined at about 45 degrees with respect to an extension direction of the data line.

In accordance with an exemplary embodiment of the present invention, a display panel is provided. The display panel includes a lower substrate including a gate line and a data line that intersect each other on a first base substrate, a pixel electrode formed on the gate line and the data line and an first alignment film formed on the pixel electrode. The first alignment film includes a first alignment layer and a first light reactor disposed on the first alignment layer, and the gate line and data line define a pixel area divided into a first domain aligned in a first direction and a second domain aligned in a second direction which is different from the first direction.

The display panel further includes an upper substrate including a second base substrate opposing the lower substrate, a common electrode formed on the second base substrate and a second alignment film formed on the common electrode. The second alignment film includes a second alignment layer and a second light reactor disposed on the second alignment layer.

In addition, the display panel includes a liquid crystal layer disposed between the lower substrate and the upper substrate, and the liquid crystal layer includes liquid crystals that aligned by the first alignment film and the second alignment film in a first direction in the first domain of the pixel area and are aligned by the first alignment film and the second alignment film in a second direction different from the first direction in the second domain of the pixel area.

According to exemplary embodiments of the invention, one pixel area is divided into two domains, and the two domains have the different alignment directions from each other. Thus, the viewing angle and the uniformity of the color reproduction may increase.

Moreover, by using three light scanning processes with or without masks, the alignment directions may be formed at an inclined angle of about 45 degrees with respect to the gate line and the data line. Thus, a large size display apparatus may be manufactured since various polarizing sheets may be applicable.

BRIEF DESCRIPTION OF THE DRAWINGS

Exemplary embodiments of the invention can be understood in more detail from the following detailed description taken in conjunction with the accompanying drawings, in which:

FIG. 3 is a plan view illustrating a display panel in accordance with an exemplary embodiment of the present invention illustrated in FIG. 2;

FIG. 7 is a plan view illustrating a display panel in accordance with an exemplary embodiment of the present invention;

FIG. 9 is a plan view illustrating a pixel area of a display panel in accordance with an exemplary embodiment of the present invention;

DETAILED DESCRIPTION

It will be understood that when an element or layer is referred to as being "on" another element or layer, the element or layer can be directly on another element or layer or intervening elements or layers. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be explained in detail with reference to the accompanying drawings.

Figure 1A:
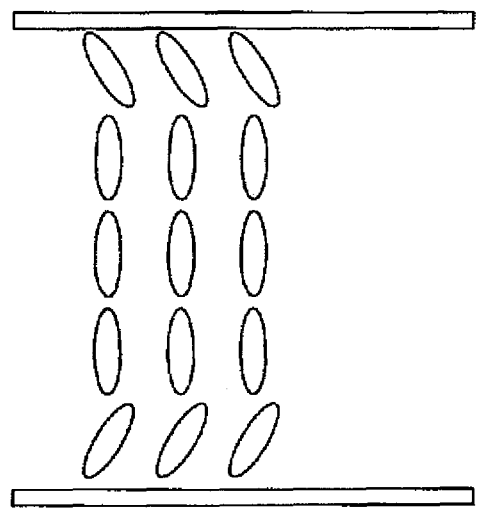
FIG. 1A and FIG. 1B are cross-sectional views illustrating a liquid crystal alignment of an OCB mode.
Figure 1B:
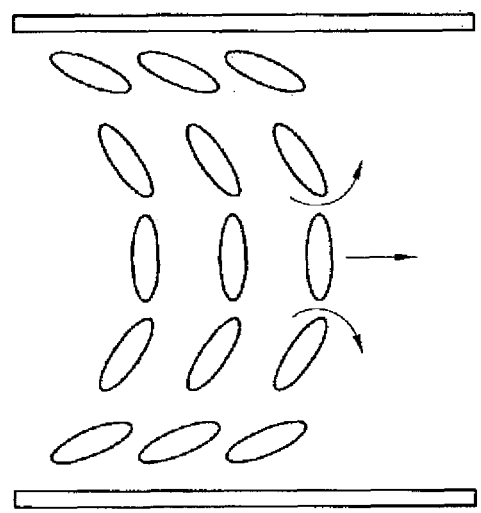
Figure 2:
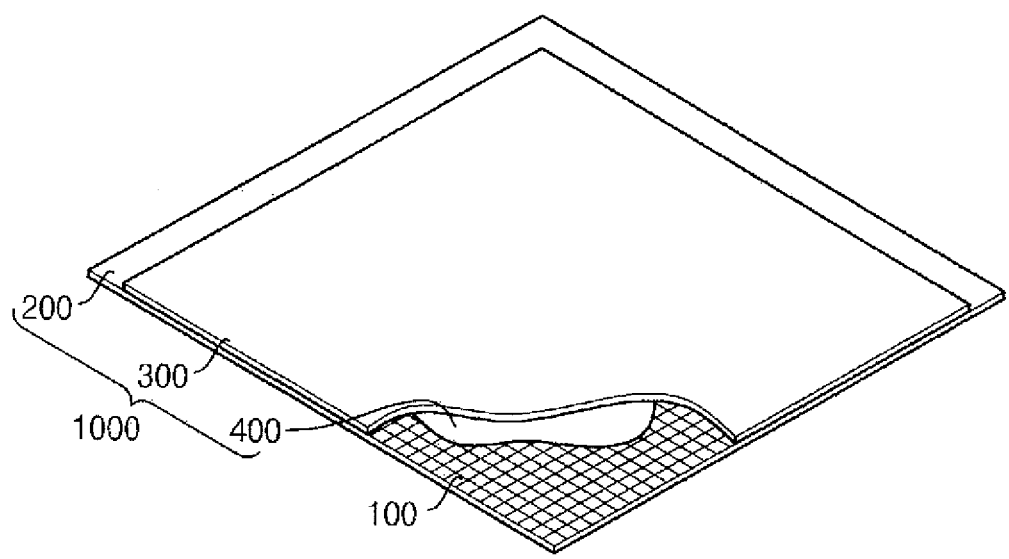
FIG. 2 is a perspective view illustrating a display panel in accordance with an exemplary embodiment of the present invention.

FIG. 2 is a perspective view illustrating a display panel in accordance with an exemplary embodiment of the present invention. FIG. 3 is a plan view illustrating a display panel in accordance with the embodiment in FIG. 2.

Referring to FIG. 2 and FIG. 3, a display panel 1000 in accordance with an embodiment of the present invention includes a lower substrate 200, an upper substrate 300 and a liquid crystal layer 400. The lower substrate 200, the upper substrate 300 and the liquid crystal layer 400 correspond to a plurality of pixel areas 100.

The lower substrate 200 and the upper substrate 300 are adhered to each other by, for example, a sealing member having a frame form. A display area is defined by the lower substrate 200, the upper substrate 300 and the sealing member. A liquid crystal is, for example, injected into the display area so as to form the liquid crystal layer 400. The lower substrate 200 and the upper substrate 300 are alignment substrates. The lower substrate 200 and the upper substrate 300 align molecules of the liquid crystal layer 400. The upper substrate 300 may be a color filter substrate having, for example, a red (R), green (G), blue (B) color filter. The lower substrate 200 may be an element substrate driving in an active matrix driving method using switching elements.

Referring to FIG. 3, a gate line GL extended in a left-right direction and a data line DL extended in an up-down direction are formed at the lower substrate 200. A plurality of the gate lines GL are formed spaced apart in the up-down direction, and a plurality of the data lines DL are formed spaced apart in the left-right direction.

Thin film transistors 230 are connected to gate lines GL and the data lines DL. A pixel area 100 is formed adjacent to the gate line GL and the data line DL. A pixel electrode 260, which is electrically connected to the thin film transistor 230, is formed in the pixel area. For example, the pixel area 100 may be defined by the gate line GL and the data line DL.

The pixel area 100 may be divided into, for example, a first domain 100a and a second domain 100b. The criterion, in which the first domain 100a and the second domain 100b are divided, is a liquid crystal alignment. The first domain 100a and the second domain 100b have different liquid crystal alignments. In one unit pixel area 100, the first domain 100a and the second domain 100b are divided into, for example, an upper area and a lower area, respectively. Alternatively, the first domain 100a and the second domain 100b may be divided into, for example, a left area and a right area, respectively. The OCB mode is used in the present embodiment but exemplary embodiments of the present invention are not limited thereto, and the alignment directions of the liquid crystal in the upper substrate 300 and the lower substrate 200 are the substantially same. Thus, in some spot in the first domain 100a or the second domain 100b, the alignment direction provided by the upper substrate and the alignment direction provided by the lower substrate are the substantially same.

Figure 4A:
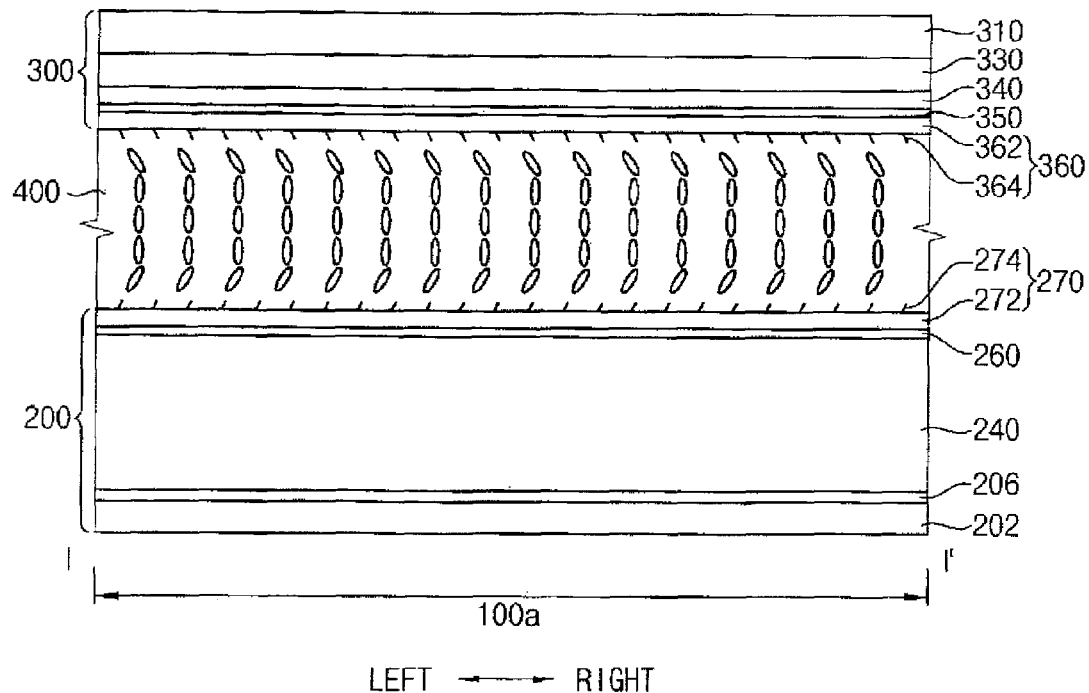
FIG. 4A is a cross-sectional view of the display panel taken along a line I-I' in FIG. 3.

FIG. 4A is a cross-sectional view of the display panel taken along a line I-I' in FIG. 3.

It is noted that the lower substrate 200, the upper substrate 300 and the liquid crystal layer 400 are formed in both the first domain 100a and the second domain 100b of the pixel area 100.

In particular, it is noted that FIG. 4A illustrates the portions of the lower substrate 200, the upper substrate 300 and the liquid crystal layer 400 of the display panel of FIG. 3 which are formed in the first domain 100a of the pixel area 100.

For example, referring to FIG. 4A, the lower substrate 200 includes, for example, a first base substrate 202, a plurality of gate lines GL and data lines DL disposed on the first base substrate 202, an insulation layer 206 formed on the gate lines GL and the data lines DL, an organic insulation layer 240 formed on the insulation layer 206, a pixel electrode 260 formed on the organic insulation layer 240 and a first alignment film 270.

The pixel electrode 260 may comprise, for example, a transparent conductive material such as indium tin oxide (ITO), aluminum zinc oxide (AZO), cadmium tin oxide (CTO), indium zinc oxide (IZO), aluminum tin oxide (ATO), hafnium oxide (HfO), or others, or any combinations thereof. Alternatively, in an embodiment, the pixel electrode 260 may be made of, for example, a reflective electric conductor such as aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof.

The insulation layer 206 may comprise, for example, silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

Moreover, the organic insulation layer 240 may comprise, for example, organic material such as benzocyclobutene (BCB), an acryl resin, a polyimide resin or a combination thereof.

The first base substrate 202 may comprise, for example, a transparent material (e.g., glass, quartz, etc), non-transparent material (e.g., silicon plate, ceramics, etc), flexible material (e.g., polyester, polyethylene, polyamide, polyethanol, polycyclane, polyphenol, thinner glass, others, or combination of them) or any combination thereof.

The first alignment film 270 is formed on the pixel electrode 260 and aligns the liquid crystal of the liquid crystal layer 400. The first alignment film 270 includes, for example, a first alignment layer 272 and a first light reactor 274. The first light reactor 274 is disposed on the first alignment layer 272 and forms an inclined angle by scanning light.

The first light reactor 274 determines the alignment direction of the first alignment film 270. In the first domain 100a, the direction of the first light reactor 274 determines a first direction. The first direction may be substantially the same as the extension direction of the gate line GL. The direction in which the first light reactor 274 is disposed in the first domain 100a may be, for example, the direction from left to right in the first domain 100a.

Alternatively, in an embodiment, the first direction may be substantially the same as the extension direction of the data line DL.

The upper substrate 300 includes, for example, a second base substrate 310 opposing the first base substrate 202 of the lower substrate 200, a color filter 330 formed on the second base substrate 310, an over-coating layer 340 formed on the color filter 330, a common electrode 350 formed on the over-coating layer 340 and configured to form electrical fields with the pixel electrode 260, and a second alignment film 360.

The second base substrate 310 may comprise, for example, a transparent material (e.g., glass, quartz, etc), non-transparent material (e.g., silicon plate, ceramics, etc), flexible material (e.g., polyester, polyethylene, polyamide, polyethanol, polycyclane, polyphenol, thinner glass, others, or combination of them), or any combination thereof.

The common electrode 350 may comprise, for example, a transparent conductive material, such as indium tin oxide (ITO), aluminum zinc oxide (AZO), cadmium tin oxide (CTO), indium zinc oxide (IZO), aluminum tin oxide (ATO), hafnium oxide (HfO), or others, or any combinations thereof.

The over-coating layer 340 may include, for example, an organic material [e.g., photo resist, polyarylene ether (PAE), polyester, polyethylene, polyamide, polyethanol, benzocyciclobutene (BCB), hydrogen silsesquioxane (HSQ), methyl silesquioxane (MSQ), SiOC—H, or some other material or a combination of the above], an inorganic material (e.g., silicon oxides, silicon nitrides, silicon oxy-nitride, silicon carbonates, hafnium oxides, or some other material or a combination of the above), or any combinations thereof.

The second alignment film 360 is formed on the common electrode 350 and aligns the liquid crystal of the liquid crystal layer 400. The second alignment film 360 includes, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the first domain 100a, the direction of the second light reactor 364 faces the first direction, which is substantially the same as the direction of the first light reactor 274. The first direction may be, for example, substantially the same as the extension direction of the gate line GL. The direction in which the second light reactor 364 is disposed in the first domain 100a may be, for example, the direction from left to right in the first domain 100a.

Figure 4B:
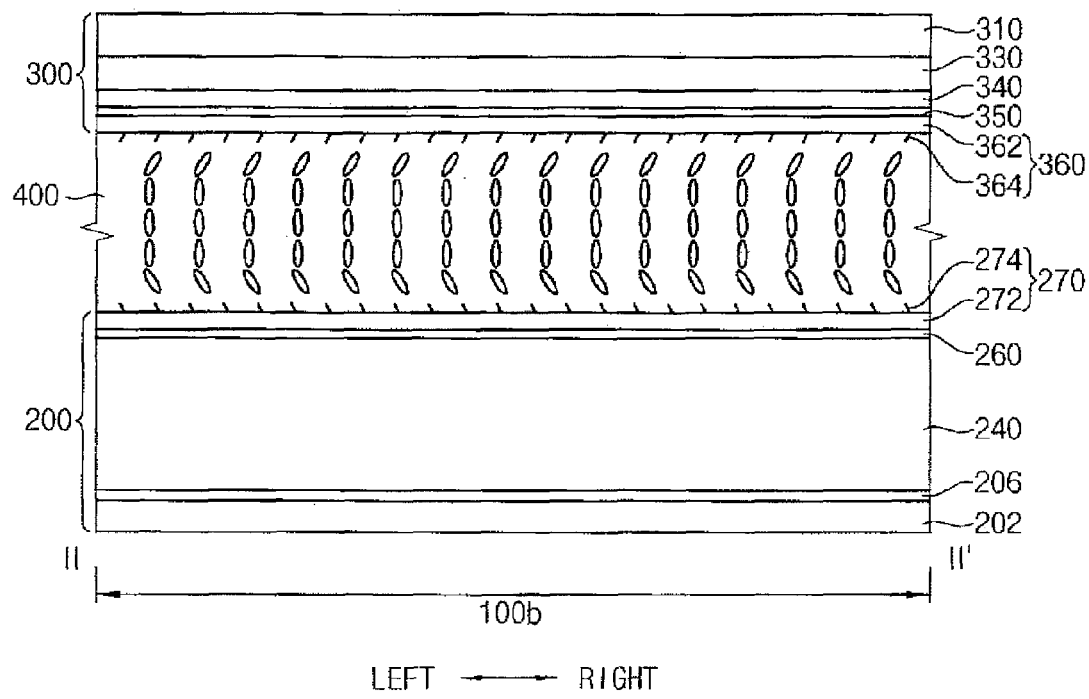
FIG. 4B is a cross-sectional view of the display panel taken along a line II-II' in FIG. 3.

FIG. 4B is a cross-sectional view of the display panel taken along a line II-II' in FIG. 3.

It is noted that FIG. 4B illustrates the portions of the lower substrate 200, the upper substrate 300 and the liquid crystal layer 400 of the display panel of FIG. 3 which are formed in the second domain 100b of the pixel area 100.

For example, referring to FIG. 4B, the lower substrate 200 includes, for example, a first base substrate 202, a plurality of gate lines GL and data lines DL disposed on the first base substrate 202, an insulation layer 206 formed on the gate lines GL and the data lines DL, an organic insulation layer 240 formed on the insulation layer 206, a pixel electrode 260 formed on the organic insulation layer 240 and a first alignment film 270. The first alignment film 270 is formed on the pixel electrode 260 and aligns the liquid crystal of the liquid crystal layer 400. The first alignment film 270 includes, for example, a first alignment layer 272 and a first light reactor 274. The first light reactor 274 is disposed on the first alignment layer 272 and forms an inclined angle by scanning light.

The first light reactor 274 determines the alignment direction of the first alignment film 270. In the second domain 100b, the direction of the first light reactor 274 determines a second direction. The second direction may be, for example, substantially the same as the extension direction of the gate line GL and may be substantially the opposite direction to the first direction. The direction in which the first light reactor 274 is disposed in the second domain 100b may be, for example, the direction from the right to the left in the second domain 100b.

Alternatively, in an embodiment, the second direction may be, for example, substantially the same as the extension direction of the gate line DL and may be substantially the opposite direction to the first direction.

The upper substrate 300 includes, for example, a second base substrate 310 opposing the first base substrate 202 of the lower substrate 200, a color filter 330 formed on the second base substrate 310, an over-coating layer 340 formed on the color filter 330, a common electrode 350 formed on the over-coating layer 340 and configured to form electrical fields with the pixel electrode 260, and a second alignment film 360. The second alignment film 360 is formed on the common electrode 350 and aligns the liquid crystal of the liquid crystal layer 400. The second alignment film 360 includes, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the second domain 100b, the direction of the second light reactor 364 faces the first direction. The first direction may be, for example, substantially the same as the extension direction of the gate line GL. The direction in which the second light reactor 364 is disposed in the second domain 100b may be, for example, the direction from the right to the left in the second domain 100b.

The liquid crystal layer 400 is formed between the lower substrate 200 and the upper substrate 300 and includes liquid crystal. The liquid crystal layer 400 includes, for example, the first domain 100a and the second domain 100b. The first and second domains 100a, 100b are disposed adjacent to the gate line GL and the data line DL. The first domain 100a and the second domain 100b are divided according to the liquid crystal alignment in the pixel area including the pixel electrode 260.

Referring to FIG. 4A, in the first domain 100a, the liquid crystal is aligned in the first direction at an area adjacent to the first alignment film 270 by the first alignment film 270. In the first domain 100a, the liquid crystal is aligned in the first direction at an area adjacent to the second alignment film 360 by the second alignment film 360. Moreover, the liquid crystal which is not adjacent to the first alignment film 270 or the second alignment film 360 is aligned at a vertical direction.

Referring to FIG. 4B, in the second domain 100b, the liquid crystal is aligned in the second direction, which is different from the first direction, at an area adjacent to the first alignment film 270 by the first alignment film 270. In the second domain 100b, the liquid crystal is aligned in the second direction at an area adjacent to the second alignment film 360 by the second alignment film 360.

In the first domain 100a, the liquid crystal is aligned in the first direction. In the second domain 100b, the liquid crystal is aligned in the second direction. The first direction is different from the second direction, and the second direction may be the opposite direction of the first direction. In the present embodiment, the first direction is substantially the same as the extension direction of the gate line, and the second direction is substantially the opposite direction of the first direction.

Figure 5:
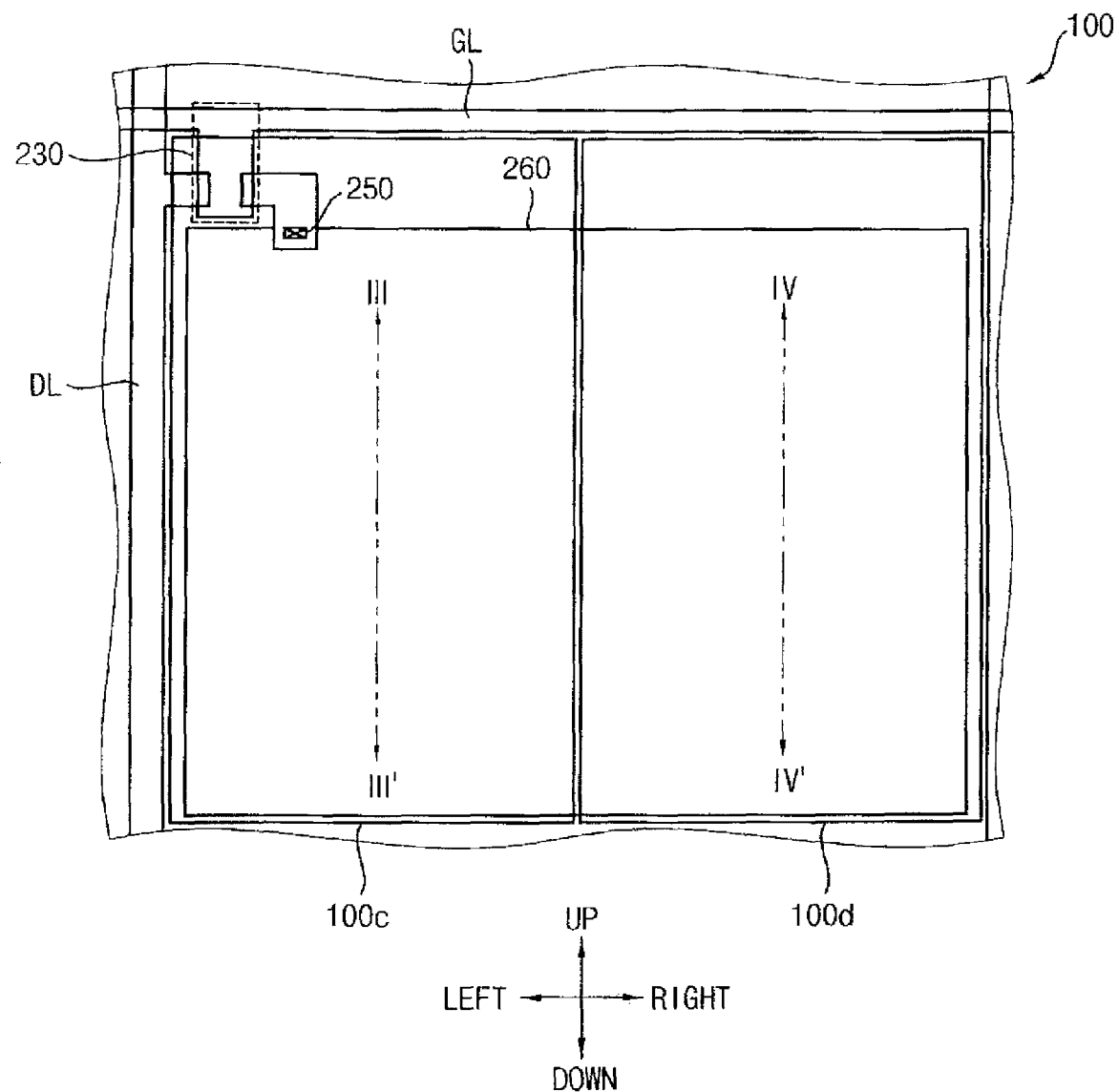
FIG. 5 is a plan view illustrating a display panel in accordance with an exemplary embodiment of the present invention.

FIG. 5 is a plan view illustrating a display panel in accordance with an exemplary embodiment of the present invention.

Referring to FIG. 5, a pixel area 100 of the present embodiment is substantially the same as the pixel area 100 of the embodiment in FIG. 3 except for a first domain 100c and a second domain 100d. Thus, the same reference numerals are used in the present embodiment to refer to the same components as illustrated in FIG. 3 and therefore a repeated description of these components will be omitted.

Referring to FIG. 5, the pixel area 100 may be divided into, for example, a first domain 100c and a second domain 100d. The first domain 100c and the second domain 100d are divided based on liquid crystal alignment. The first domain 100c and the second domain 100d have different liquid crystal alignments. In one unit pixel area 100, the first domain 100c and the second domain 100d are divided into, for example, left and right areas, respectively. The one unit pixel area 100 is divided into, for example, the left and right areas and the liquid crystal is aligned in the different directions. The OCB mode is used in the present embodiment, and the alignment directions of the liquid crystal in the upper substrate and the lower substrate are the substantially same. Thus, in some spot in the first domain 100c or the second domain 100d, the alignment direction provided by the upper substrate and the alignment direction provided by the lower substrate are the substantially same.

Figure 6A:
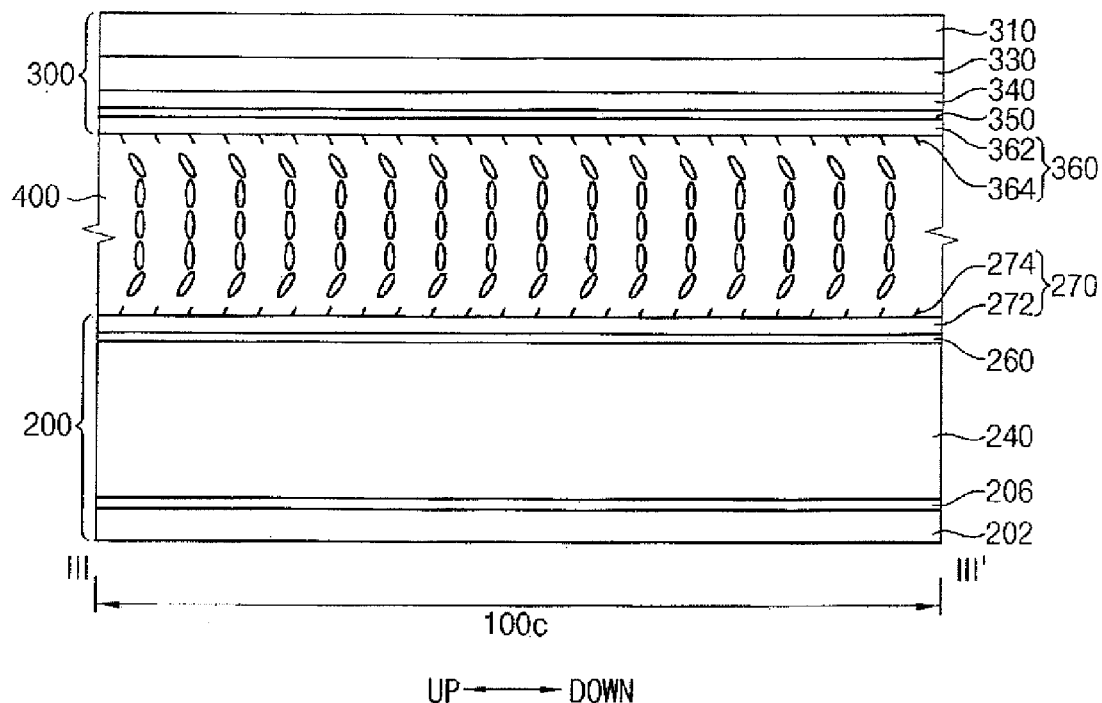
FIG. 6A is a cross-sectional view of the display panel taken along a line in FIG. 5.

FIG. 6A is a cross-sectional view of the display panel taken along a line III-III' in FIG. 5.

The display panel of the present embodiment is substantially the same as the display panel of the embodiment in FIG. 4A except the first domain 100c and the second domain 100d. Thus, the same reference numerals are used in the present embodiment to refer to the same components illustrated in FIG. 4A and therefore a repeated description of these components will be omitted.

Referring to FIG. 6A, the lower substrate 200 includes a first alignment film 270 for aligning the liquid crystal of the liquid crystal layer 400. The first alignment film 270 may include, for example, a first alignment layer 272 and a first light reactor 274. The first light reactor 274 is formed on the first alignment layer 272 and forms an inclined angle by light scanning.

The first light reactor 274 determines the alignment direction of the first alignment film 270. In the first domain 100c, the direction of the first light reactor 274 is a first direction. The first direction may be, for example, substantially the same as the extension direction of the data line DL. The direction in which the first light reactor 274 is disposed in the first domain 100c may be the direction from upwards to downwards in the first domain 100c.

The upper substrate 300 includes, for example, a second alignment film 360 for aligning the liquid crystal of the liquid crystal layer 400. The second alignment film 360 may include, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the first domain 100c, the direction of the second light reactor 364 is the first direction which is substantially the same as the direction of the first light reactor 274. The first direction may be, for example, substantially the same as the extension direction of the data line DL. The direction in which the second light reactor 364 is disposed in the first domain 100c may be the direction from upwards to downwards in the first domain 100c.

Figure 6B:
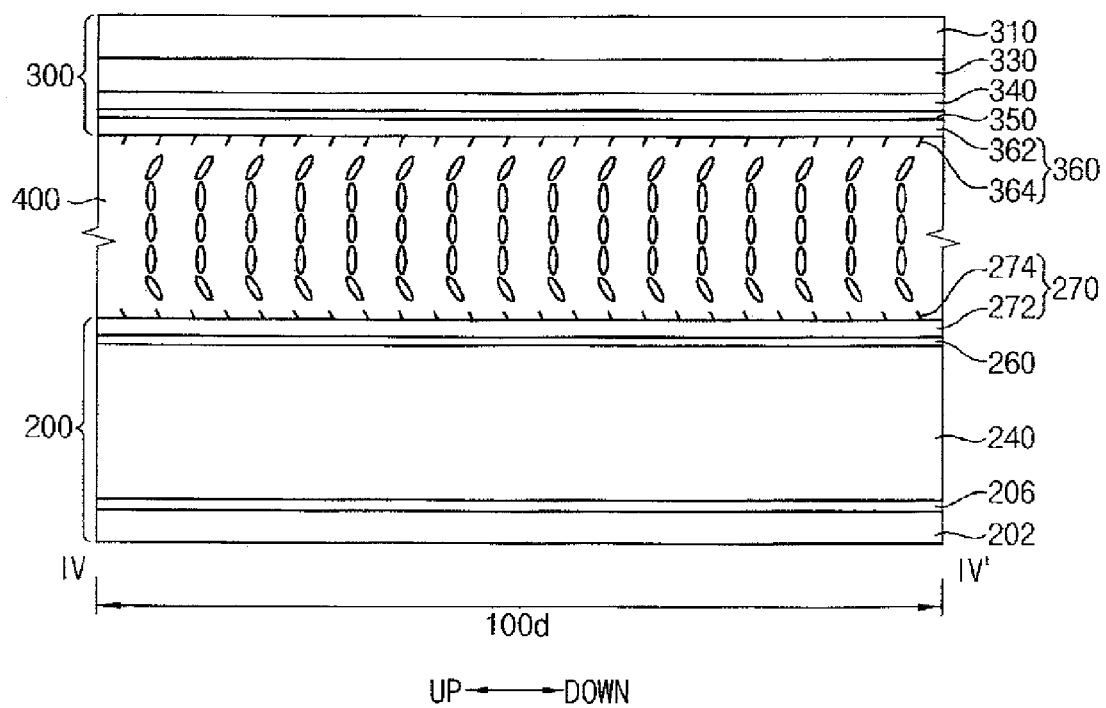
FIG. 6B is a cross-sectional view of the display panel taken along a line IV-IV' in FIG. 5.

FIG. 6B is a cross-sectional view of the display panel taken along a line IV-IV' in FIG. 5.

The display panel of the present embodiment is substantially the same as the display panel of FIG. 4B except for the first domain 100c and the second domain 100d. Thus, the same reference numerals are used in the present embodiment to refer to the same components illustrated in FIG. 4B and therefore a repeated description of these components will be omitted.

Referring to FIG. 6B, the lower substrate 200 includes a first alignment film 270. The first alignment film 270 aligns the liquid crystal of the liquid crystal layer 400. The first alignment film 270 includes, for example, a first alignment layer 272 and a first light reactor 274. The first light reactor 274 is disposed on the first alignment layer 272 and forms an inclined angle by scanning light.

The first light reactor 274 determines the alignment direction of the first alignment film 270. In the second domain 100b, the direction of the first light reactor 274 determines a second direction. The second direction may be, for example, substantially the same as the extension direction of the data line DL and may be the substantially opposite direction to the first direction. The direction in which the first light reactor 274 is disposed in the second domain 100h may be, for example, the direction from the downwards to upwards in the second domain 100b.

The upper substrate 300 includes a second alignment film 360. The second alignment film 360 aligns the liquid crystal of the liquid crystal layer 400. The second alignment film 360 includes, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the second domain 100d, the direction of the second light reactor 364 faces the first direction, which is the same as the direction of the first light reactor 274. The first direction may be, for example, substantially the same with the extension direction of the data line DL and may be substantially the opposite direction to the second direction. The direction in which the second light reactor 364 is disposed in the second domain 100d may be, for example, the direction from upwards to downwards in the second domain 100d.

The liquid crystal layer 400 is formed between the lower substrate 200 and the upper substrate 300 and includes liquid crystal. The liquid crystal layer 400 includes, for example, the first domain 100c and the second domain 100d. The first and second domains 100c, 100d are disposed adjacent to the gate line GL and the data line DL. The first domain 100c and the second domain 100d are divided according to the liquid crystal alignment in the pixel area including the pixel electrode 260.

Referring to FIG. 6A, in the first domain 100c, the liquid crystal is aligned in the first direction at an area adjacent to the first alignment film 270 by the first alignment film 270. In the first domain 100c, the liquid crystal is aligned in the first direction at an area adjacent to the second alignment film 360 by the second alignment film 360. Moreover, the liquid crystal, which is not adjacent to the first alignment film 270 or the second alignment film 360, is aligned at a vertical direction.

Referring to FIG. 6B, in the second domain 100d, the liquid crystal is aligned in the second direction, which is different from the first direction, at an area adjacent to the first alignment film 270 by the first alignment film 270. In the second domain 100d, the liquid crystal is aligned in the second direction at an area adjacent to the second alignment film 360 by the second alignment film 360.

In the first domain 100c, the liquid crystal is aligned in the first direction. In the second domain 100d, the liquid crystal is aligned in the second direction. The first direction is different from the second direction, and the second direction may be the opposite direction of the first direction. In the present embodiment, the first direction is substantially the same as the extension direction of the gate line, and the second direction is substantially the opposite direction of the first direction.

FIG. 7 is a plan view illustrating a display panel in accordance with an exemplary embodiment of the present invention.

The pixel area 100 of the present embodiment is substantially the same as the pixel area of the embodiment in FIG. 3 except the first domain 100e and the second domain 100f. Thus, the same numeral reference is used to the same component and the repeated description will be omitted.

The pixel area 100 may be divided into, for example, a first domain 100e and a second domain 100f. The first domain 100e and the second domain 100f are divided for liquid crystal alignment. The first domain 100e and the second domain 100f have different liquid crystal alignments. In one unit pixel area 100, the first domain 100e and the second domain 100f are divided, for example, into an upward area and downward area, respectively. The one unit pixel area 100 is divided, for example, into an upward area and a downward area, respectively, and the liquid crystals are aligned in different directions. The OCB mode is used in the present embodiment, and the alignment directions of the liquid crystal in the upper substrate and the lower substrate are the substantially same. Thus, in some spot in the first domain 100e or the second domain 100f, the alignment direction provided by the upper substrate and the alignment direction provided by the lower substrate are the substantially same.

Figure 8A:
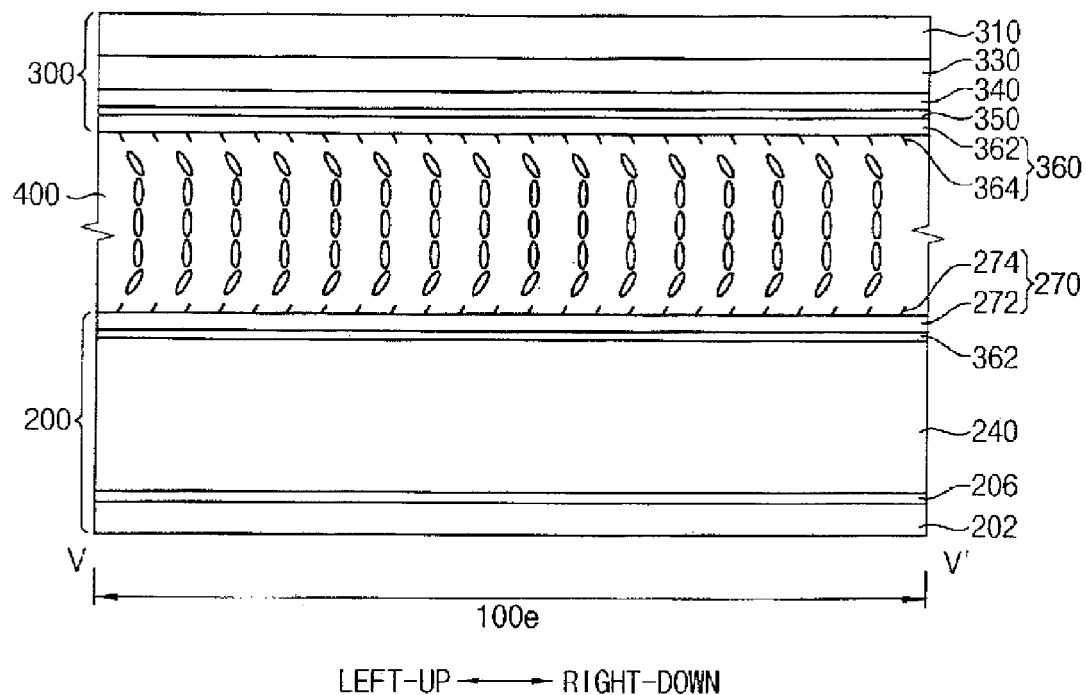
FIG. 8A is a cross-sectional view of the display panel taken along a line V-V' in FIG. 7.

FIG. 8A is a cross-sectional view of the display panel taken along a line V-V' in FIG. 7.

The display panel of the present embodiment is substantially the same as the display panel of FIG. 4A except for the first domain 100e and the second domain 100f. Thus, the same reference numerals are used in the present embodiment to refer to the same components illustrated in FIG. 4A and therefore a repeated description of these components will be omitted.

Referring to FIG. 8A, the lower substrate 200 includes a first alignment film 270 for aligning the liquid crystal of the liquid crystal layer 400. The first alignment film 270 may include, for example, a first alignment layer 272 and a first light reactor 274. The first light reactor 274 is formed on the first alignment layer 272 and forms an inclined angle by light scanning.

The first light reactor 274 determines the alignment direction of the first alignment film 270. In the first domain 100e, the direction of the first light reactor 274 faces a first direction. The first direction is inclined at, for example, about 45 degrees with respect to the extension direction of the gate line GL. The direction in which the first light reactor 274 is disposed in the first domain 100e may be, for example, the direction from left-up to right-down in the first domain 100e.

The upper substrate 300 includes a second alignment film 360 for aligning the liquid crystal of the liquid crystal layer 400. The second alignment film 360 may include, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the first domain 100e, the direction of the second light reactor 364 is, for example, the first direction which is substantially the same as the direction of the first light reactor 274. The first direction may be inclined at, for example, about 45 degrees with respect to the extension direction of the gate line GL. For example, the first direction may be inclined clockwise about 45 degrees with respect to the extension direction of the gate line GL. The direction in which the second light reactor 364 is disposed in the first domain 100e may be, for example, the direction from upper-left to lower-right in the first domain 100e.

Figure 8B:
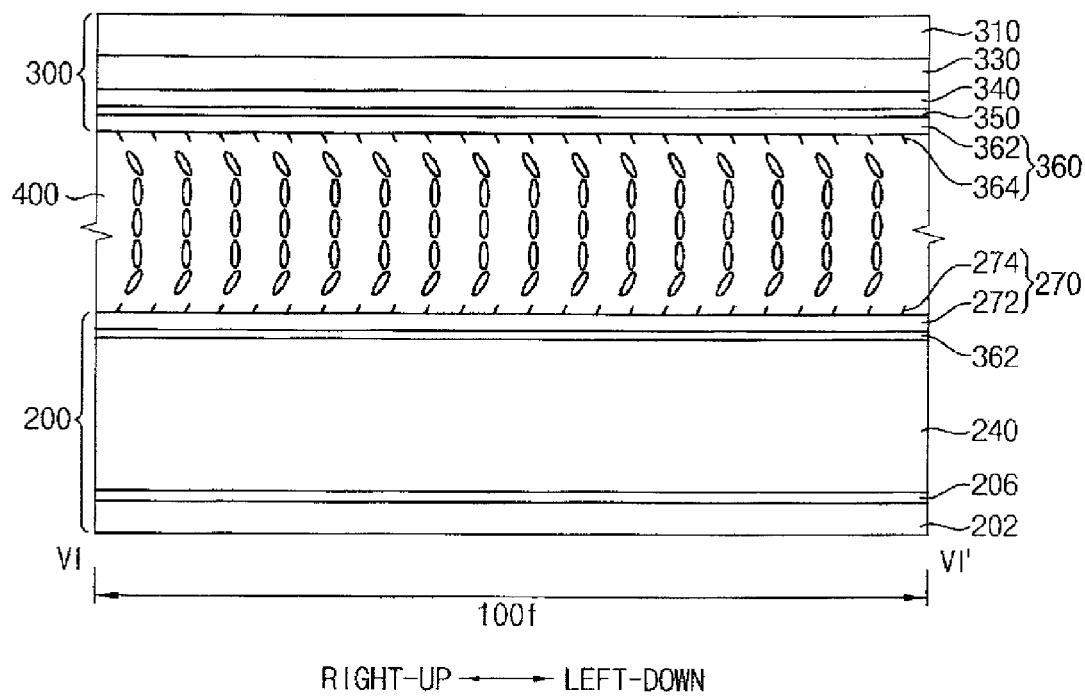
FIG. 8B is a cross-sectional view of the display panel taken along a line VI-VI' in FIG. 7.

FIG. 8B is a cross-sectional view of the display panel taken along a line VI-VI' in FIG. 7.

The display panel of the present embodiment is substantially the same as the display panel of FIG. 4B except the first domain 100e and the second domain 100f. Thus, the same reference numerals are used in the present embodiment to refer to the same components illustrated in FIG. 4B and therefore a repeated description will be omitted.

Referring to FIG. 8B, the lower substrate 200 includes a first alignment film 270. The first alignment film 270 aligns the liquid crystal of the liquid crystal layer 400. The first alignment film 270 includes, for example, a first alignment layer 272 and a first light reactor 274. The first light reactor 274 is disposed on the first alignment layer 272 and forms an inclined angle by scanning light.

The first light reactor 274 determines the alignment direction of the first alignment film 270. In the second domain 100f, the direction of the first light reactor 274 determines a second direction. The second direction may be, for example, substantially vertical to the first direction. The second direction is inclined at, for example, about 45 degrees with respect to the extension direction of the data line DL. For example, the second direction may be inclined clockwise about 45 degrees with respect to the extension direction of the data line DL. The direction in which the first light reactor 274 is disposed in the second domain 100f may be, for example, the direction from the right-up to the left-down in the second domain 100f.

The upper substrate 300 includes a second alignment film 360. The second alignment film 360 aligns the liquid crystal of the liquid crystal layer 400. The second alignment film 360 includes, for example, a second alignment layer 362 and a second light reactor 364. The second light reactor 364 is formed on the second alignment layer 362 and forms an inclined angle by light scanning.

The second light reactor 364 determines the alignment direction of the second alignment film 360. In the second domain 100f, the direction of the second light reactor 364 faces the first direction, which is the same as the direction of the first light reactor 274. The first direction may be, for example, substantially the same as the extension direction of the data line DL and may be the substantially opposite direction to the second direction. The direction in which the second light reactor 364 is disposed in the second domain 100f may be, for example, the direction from upwards to downwards in the second domain 100f.

The liquid crystal layer 400 is formed between the lower substrate 200 and the upper substrate 300 and includes liquid crystal. The liquid crystal layer 400 includes, for example, a first domain 100e and a second domain 100f. The first and second domains 100e, 100f are disposed adjacent to the gate line GL and the data line DL. The first domain 100e and the second domain 100f are divided according to the liquid crystal alignment in the pixel area including the pixel electrode 260.

Referring to FIG. 8A, in the first domain 100e, the liquid crystal is aligned in the first direction at an area adjacent to the first alignment film 270 by the first alignment film 270. In the first domain 100e, the liquid crystal is aligned in the first direction at an area adjacent to the second alignment film 360 by the second alignment film 360. Moreover, the liquid crystal, which is not adjacent to the first alignment film 270 or the second alignment film 360, is aligned at a vertical direction.

Referring to FIG. 8B, in the second domain 100f, the liquid crystal is aligned in the second direction, which is different from the first direction, at an area adjacent to the first alignment film 270 by the first alignment film 270. In the second domain 100d, the liquid crystal is aligned in the second direction at an area adjacent to the second alignment film 360 by the second alignment film 360.

In the first domain 100e, the liquid crystal is aligned in the first direction. In the second domain 100f, the liquid crystal is aligned in the second direction. For example, the first direction is substantially vertical to the second direction, and the second direction may be inclined clockwise at about 90 degrees with respect to the first direction. In the present embodiment, the first direction is, for example, inclined clockwise at about 45 degrees with respect to the extension direction of the gate line, and the second direction is, for example, inclined clockwise at about 45 degrees with respect to the extension direction of the data line.

Alternatively, the first direction may be, for example, inclined clockwise at 45 degrees with respect to the extension direction of the data line, and the second direction may be, for example, inclined clockwise at about 135 or about 225 degrees with respect to the extension direction of the gate line. As long as the first direction is inclined at about 45 degrees with respect to the second direction, the first direction may be adjustable for increased manufacturing or for the application of a polarizing sheet.

FIG. 9 is a plan view illustrating a pixel area of a display panel in accordance with an exemplary embodiment of the present invention.

Referring to FIG. 9, a pixel area 100 of the present embodiment includes, for example, a first domain 100a and a second domain 100b. The alignment direction of the liquid crystal is determined according to the first and second domains 100a and 100b in the pixel area 100. The liquid crystal alignment of the alignment film used in the display panel is determined according to the first and second domains 100a and 100b.

Figure 10A:
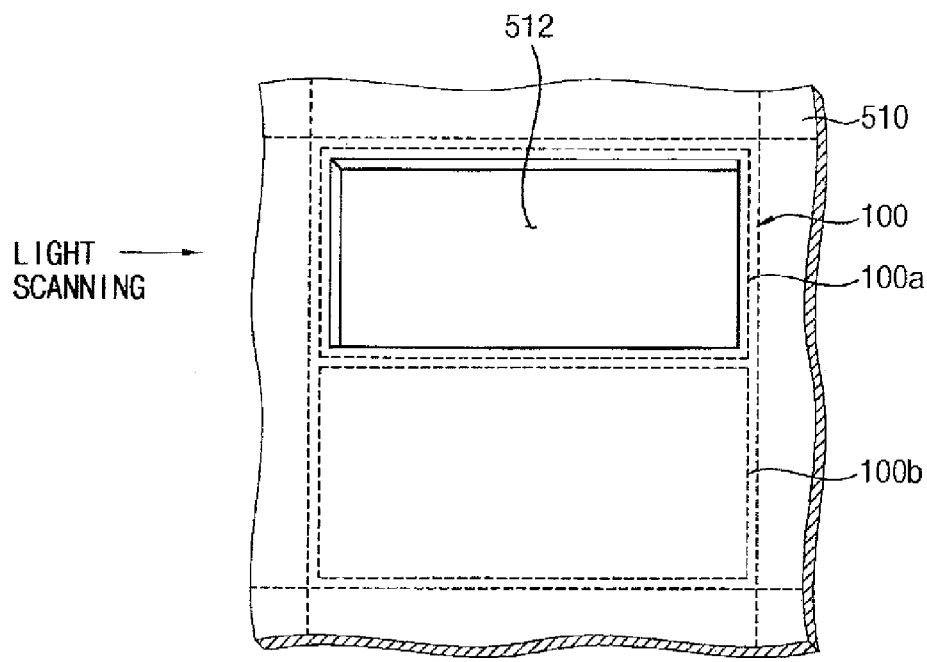
FIG. 10A and FIG. 10B are plan views illustrating a method for manufacturing the display panel in FIG. 9.
Figure 10B:
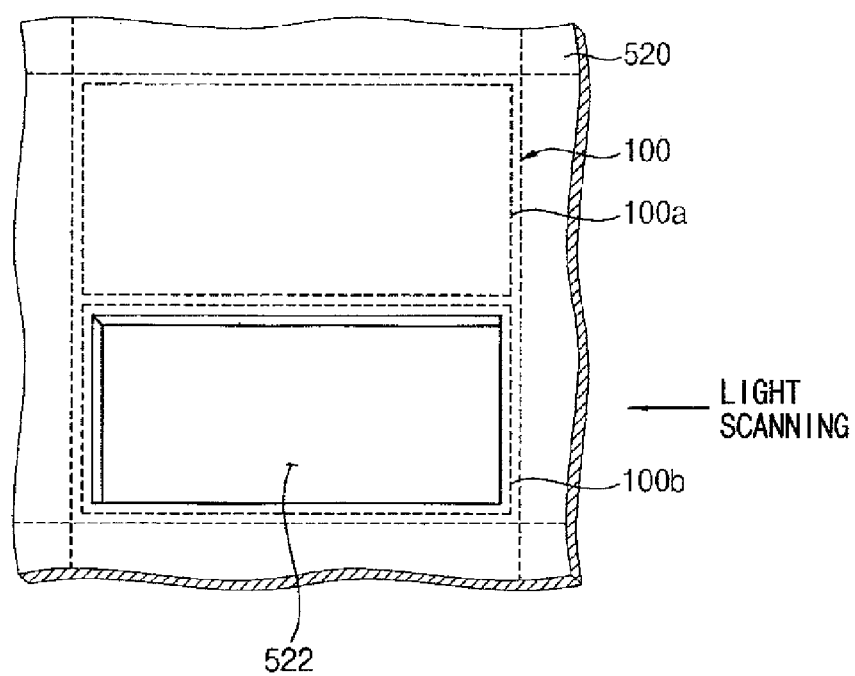

FIG. 10A and FIG. 10B are plan views illustrating a method for manufacturing the display panel in FIG. 9.

For example, referring to FIG. 10A and FIG. 10B, a first mask 510 and a second mask 520 are used in a method for manufacturing a display panel. The first mask 510 exposes only the first domain 100a, and the second mask 520 exposes only the second domain 100b. A first exposed area 512, which is exposed by the first mask 510, corresponds to the first domain 100a. A second exposed area 522, which is exposed by the second mask 520, corresponds to the second domain 100b. The display panel manufactured by the method of the present embodiment is manufactured by light exposure using the first mask 510 and the second mask 520. The areas exposed by the first mask 510 and the second mask 520 have different alignment directions.

Referring to FIG. 10A, the first mask 510 exposes the first domain 100a, and the light is scanned in a first direction toward the first exposed area 512, which is exposed by the first mask 510. The first direction may be, for example, substantially the same as the extension direction of the gate line. Alternatively, the first direction may be, for example, substantially the same as the extension direction of the data line. The light is scanned throughout the entire of the pixel area 100, but only the first exposed area 512 is exposed by the first mask 510. Only the first exposed area 512 has the alignment in the first direction.

Referring to FIG. 10B, the second mask 520 exposes the second domain 100b, and the light is scanned in a second direction toward the second exposed area 522, which is exposed by the second mask 520. The second direction is different from the first direction. The second direction may be, for example, substantially the opposite direction of the first direction. The light is scanned throughout the entire of the pixel area 100, but only the second exposed area 522 is exposed by the second mask 520. Only the second exposed area 522 has the alignment in the second direction.

The first mask 510 and the second mask 520 are formed according to the first domain 100a and the second domain 100b. To form one display panel, the first alignment film and the second alignment film may be needed. Thus, the first mask 510 may be used for both of the first alignment film and the second alignment film. In the same way, the second mask 520 may be used for both of the second alignment film and the second alignment film.

FIG. 11A to 11D are cross-sectional views illustrating a method for manufacturing the display panel in FIG. 9.

Figure 11A:
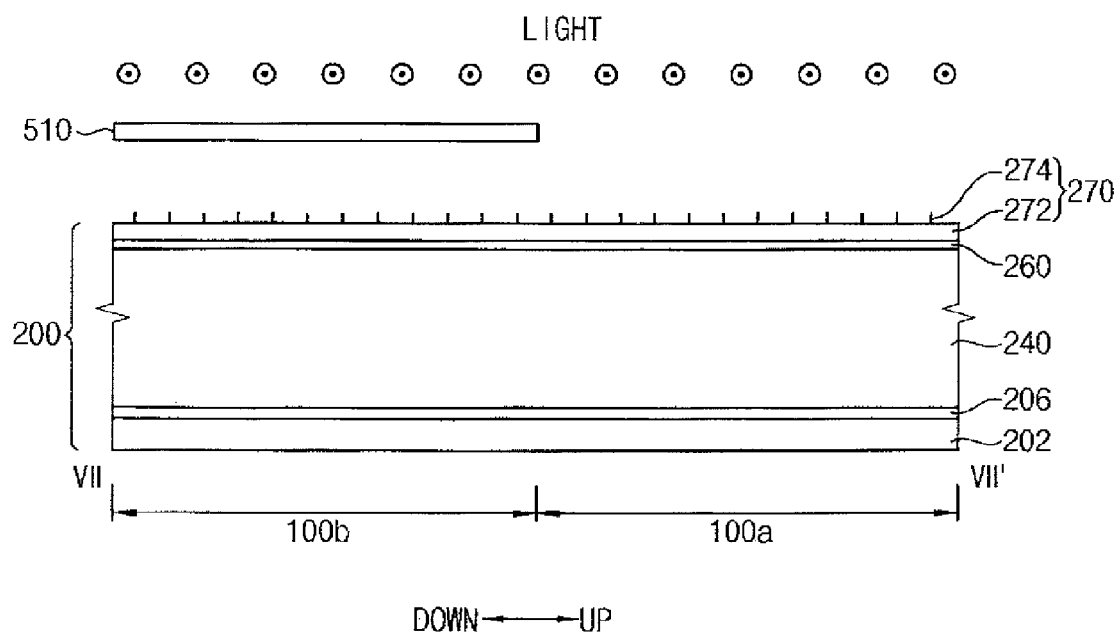
FIG. 11A to 11D are cross-sectional views illustrating a method for manufacturing the display panel in FIG. 9.
Figure 11B:
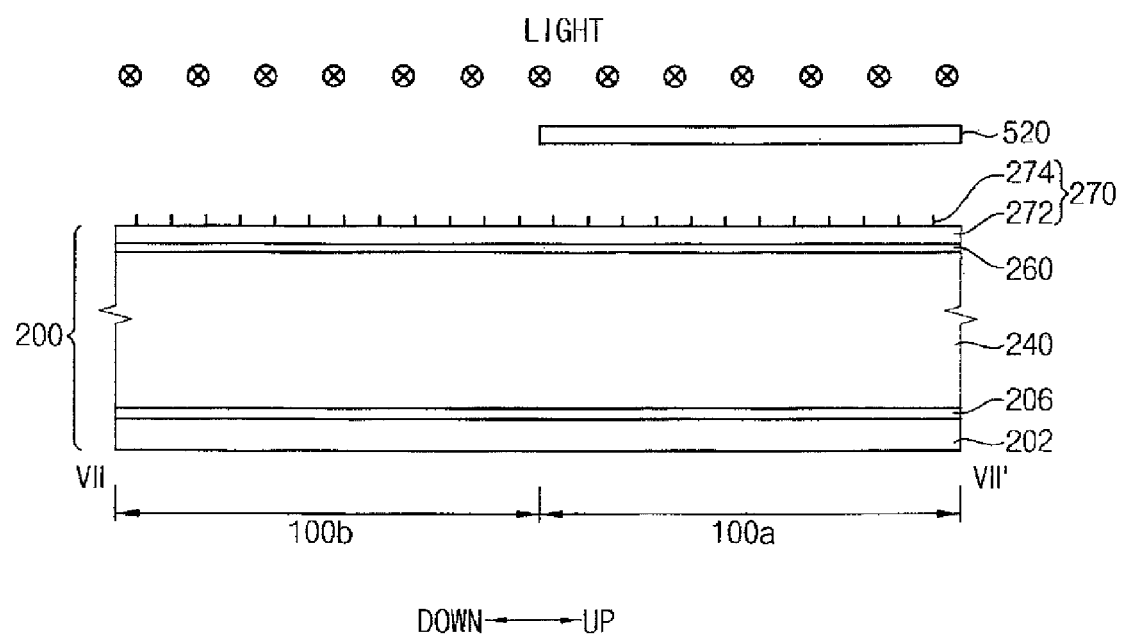

FIG. 11A and FIG. 11B are cross-sectional views illustrating a step for forming a first alignment film of a lower substrate of the display panel.

Referring to FIG. 11A, a lower substrate 200 is formed before forming the first alignment film 270. The lower substrate 200 is formed by, for example, forming a gate line and a data line on a first base substrate 202, forming an insulation layer 206 on the gate line and data line, forming an organic insulation layer 240 on the insulation layer 206 and forming a pixel electrode 260 on the organic insulation layer 240.

The pixel electrode 260 may comprise, for example, a transparent conductive material such as indium tin oxide (ITO), aluminum zinc oxide (AZO), cadmium tin oxide (CTO), indium zinc oxide (IZO), aluminum tin oxide (ATO), hafnium oxide (HfO), or others, or any combinations thereof. Alternatively, in an embodiment, the pixel electrode 260 may comprise, for example, a reflective electric conductor such as aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof.

The insulation layer 206 may comprise, for example, silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

Moreover, the organic insulation layer 240 may comprise, for example, organic material such as benzocyclobutene (BCB), an acryl resin, a polyimide resin or a combination thereof.

The first base substrate 202 may comprise, for example, a transparent material (e.g., glass, quartz, etc), non-transparent material (e.g., silicon plate, ceramics, etc), flexible material (e.g., polyester, polyethylene, polyamide, polyethanol, polycyclane, polyphenol, thinner glass, others, or combination of them) or any combination thereof.

The first alignment film 270 including, for example, a first domain 100a and a second domain 100b is formed on the pixel electrode 260 of the lower substrate 200. The first alignment film 270 corresponds to one pixel area. The first alignment layer 270 includes, for example, a first alignment layer 272 and a first light reactor 274. The first light reactor 274 is formed on the first alignment layer 272 and forms an inclined angle by light scanning.

The first light reactor 274 is initially formed without an alignment direction. The first light reactor 274 has the alignment direction by light scanning. The light used in forming the alignment direction may be, for example, ultraviolet light. Instead of the ultraviolet light, other energy radiation such as, for example, visible light, infrared light and X rays may be used in forming the alignment direction. Alternatively, for example, in an embodiment, laser light may be used in forming the alignment direction.

The light is scanned in the first direction with the first mask 510 on the first alignment film 270. The first mask 510 exposes the first domain 100a, and blocks the second domain 100b. Thus, only the area of the first alignment film 270 corresponding to the first domain 100a has the alignment in the first direction.

Referring to FIG. 11B, the light is scanned through the first mask 510, and the light is scanned to a part of the first alignment film 270 before the light is scanned through the second mask 520.

The alignment is formed in a part of the first light reactor 274 during light scanning by the first mask 510, but, the rest of the first light reactor 274 still does not have the alignment. The alignment of the rest of the first alignment film 270 is formed by light scanning by the second mask 520. The light is scanned throughout the rest of the first alignment film 270 to form the alignment direction. The light used in forming the alignment direction may be, for example, ultraviolet light. Instead of the ultraviolet light, other energy radiation such as, for example, visible light, infrared light and X rays may be used in forming the alignment direction. Alternatively, for example, in an embodiment, laser light may be used in forming the alignment direction.

The light is scanned on the first alignment layer 270 with the second mask 520. The second direction is different from the first direction. The second direction may be, for example, substantially the opposite direction to the first direction. The second mask 520 exposes the second domain 100b and blocks the first domain 100a. Thus, the alignment is formed in the second direction at the area of the first alignment film 270 corresponding to the second domain 100b.

Figure 11C:
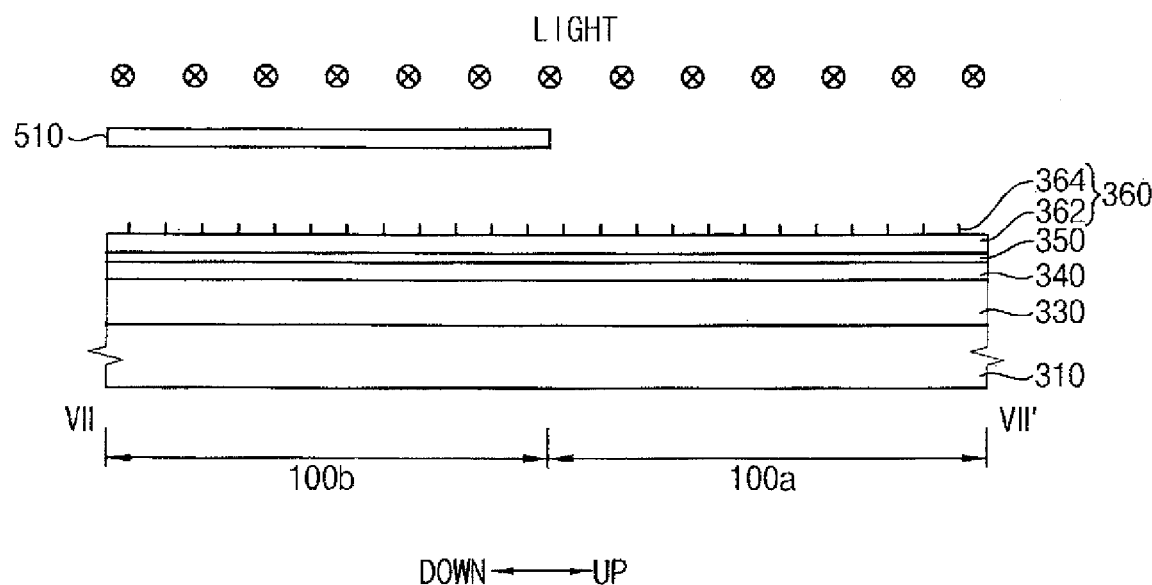
Figure 11D:
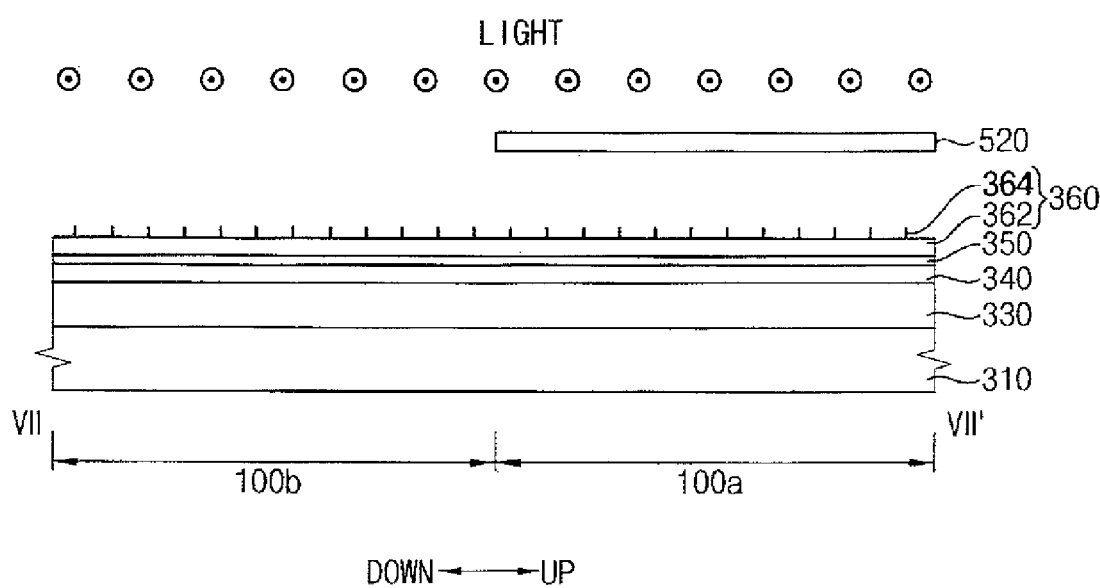

FIG. 11C and FIG. 11D are cross-sectional views illustrating a step for forming a second alignment film of an upper substrate of the display panel.

The upper substrate 300 is formed, for example, by forming a second base substrate 310 opposite to the first base substrate 202 of the lower substrate 200, forming a color filter 330 on the second base substrate 310, forming an over-coating layer 340 on the color filter 330 and forming a common electrode 350 on the over-coating layer 340.

The second base substrate 310 may comprise, for example, a transparent material (e.g., glass, quartz, etc), non-transparent material (e.g., silicon plate, ceramics, etc), flexible material (e.g., polyester, polyethylene, polyamide, polyethanol, polycyclane, polyphenol, thinner glass, others, or combination of them) or any combination thereof.

The common electrode 350 may comprise, for example, a transparent conductive material, such as indium tin oxide (ITO), aluminum zinc oxide (AZO), cadmium tin oxide (CTO), indium zinc oxide (IZO), aluminum tin oxide (ATO), hafnium oxide (HfO), or others, or any combinations thereof.

The over-coating layer 340 may include, for example, an organic material [e.g., photo resist, polyarylene ether (PAE), polyester, polyethylene, polyamide, polyethanol, benzocyciclobutene (BCB), hydrogen silsesquioxane (HSQ), methyl silesquioxane (MSQ), SiOC—H, or some other material or a combination of the above], an inorganic material (e.g., silicon oxides, silicon nitrides, silicon oxy-nitride, silicon carbonates, hafnium oxides, or some other material or a combination of the above), or any combinations thereof.

The second alignment film 360 is formed on the common electrode 350 for aligning the liquid crystal of the liquid crystal layer 400. The second alignment film 360 includes, for example, a third domain 100a and a fourth domain 100b. The first domain 100a and the third domain 100a may be, for example, substantially the same area, and the second domain 100b and the fourth domain 100b may be, for example, substantially the same area. The only difference between the first and second domain 100a and 100b or the third and fourth domain 100a and 100b is where the domain implements. The first and second domains 100a and 100b are for the lower substrate 200, and the third and fourth domains 100a and 100b are for the upper substrate 300.

The second alignment film 360 includes, for example, a second alignment layer 362 and a second light reactor 364. The second light reactor 364 formed on the second alignment layer 362 and forms an inclined angle by light scanning.

The second light reactor 362 is initially formed without alignment direction. The second light reactor 362 has the alignment direction by light scanning. The light used in forming the alignment direction may be, for example, ultraviolet light. Instead of ultraviolet light, other energy radiation such as, for example, visible light, infrared light and X rays may be used in forming the alignment direction. Alternatively, for example, in an embodiment, laser light may be used in forming the alignment direction.

The light is scanned in the first direction with the first mask 510 on the second alignment film 360. The first direction is, for example, substantially the same direction as the scanning direction of the first alignment film with the first mask 510. The first mask 510 exposes the third domain 100a, and blocks the fourth domain 100b. Thus, only the area of the second alignment film 360 corresponding to the third domain 100a has the alignment in the first direction.

Referring to FIG. 11D, the light is scanned through the first mask 510, and the light is scanned to a part of the second alignment film 360 before the light is scanned through the second mask 520.

The alignment is formed in a part of the second light reactor 364 during light scanning by the first mask 510, but, the rest of the second light reactor 364 still does not have the alignment. The alignment of the rest of the second alignment film 360 is formed by light scanning by the second mask 520. The light is scanned throughout the rest of the second alignment film 360 to form the alignment direction. The light used in forming the alignment direction may be, for example, ultraviolet (LTV) light. Instead of ultraviolet light, other energy radiation such as, for example, visible light, infrared light and X rays may be used in forming the alignment direction. Alternatively, for example, in an embodiment, laser light may be used in forming the alignment direction.

The light is scanned on the second alignment layer 360 with the second mask 520. The second direction is different from the first direction. The second direction may be, for example, substantially the opposite direction to the first direction. The second mask 520 exposes the fourth domain 100b and blocks the third domain 100a. Thus, the alignment is formed in the second direction at the area of the second alignment film 360 corresponding to the fourth domain 100b.

Thus, the OCB display panel including, for example, a first domain 100a and a second domain 100b, which have different liquid crystal alignment directions from each other, in one pixel area 100, is manufactured.

Figure 12:
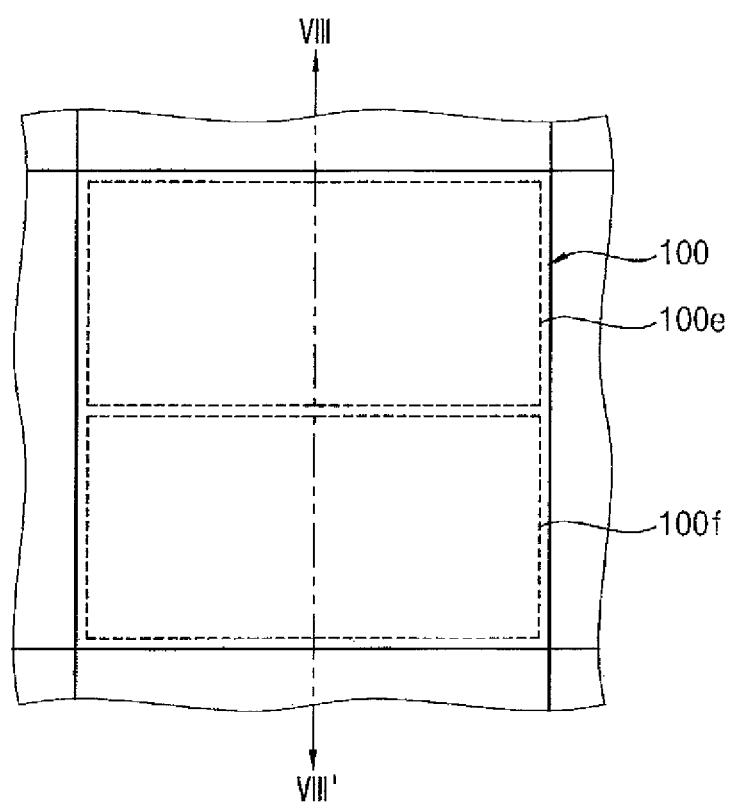
FIG. 12 is a plan view illustrating a pixel area of a display panel in accordance with an exemplary embodiment of the present invention.

FIG. 12 is a plan view illustrating a pixel area of a display panel in accordance with an exemplary embodiment of the present invention.

Referring to FIG. 12, a pixel area 100 of the present embodiment includes, for example, a first domain 100e and a second domain 100f. The alignment direction of the liquid crystal is determined according to the first and second domains 100e and 100f in the pixel area 100. The liquid crystal alignment of the alignment film used in the display panel is determined according to the first and second domains 100e and 100f.

Figure 13A:
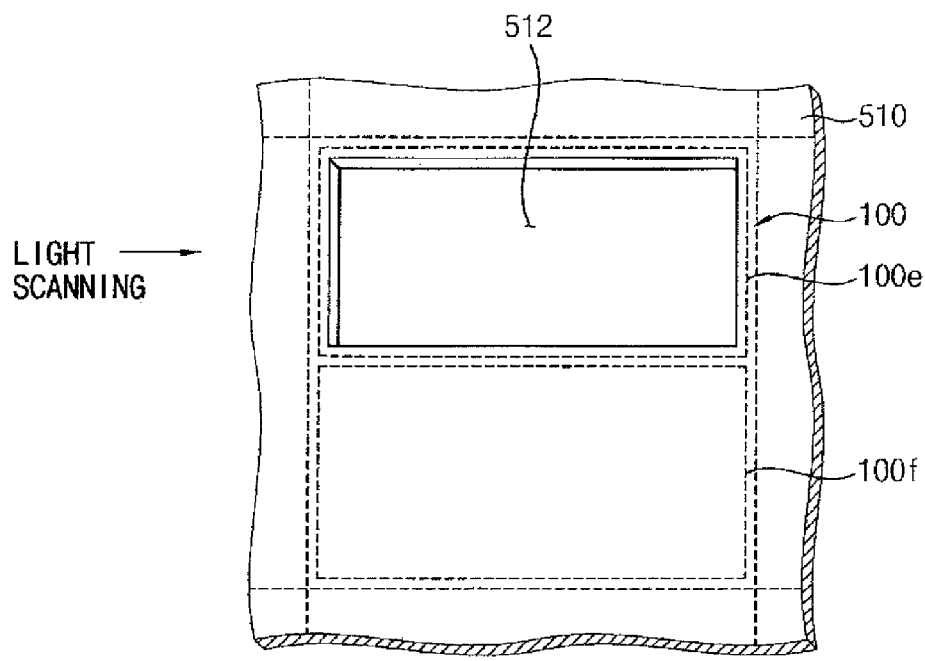
FIG. 13A to FIG. 13C are plan views illustrating a method for manufacturing the display panel in FIG. 12.
Figure 13B:
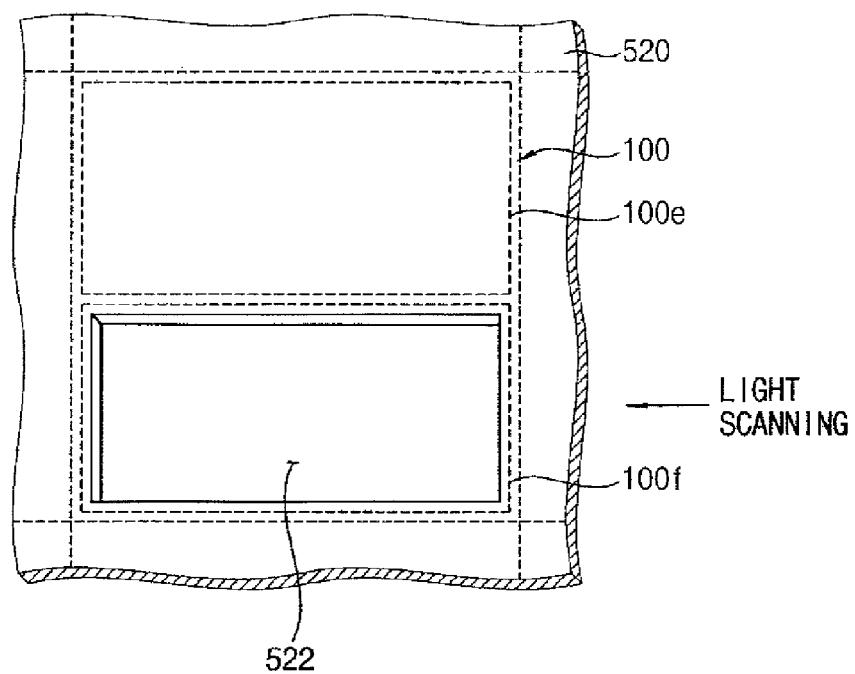
Figure 13C:
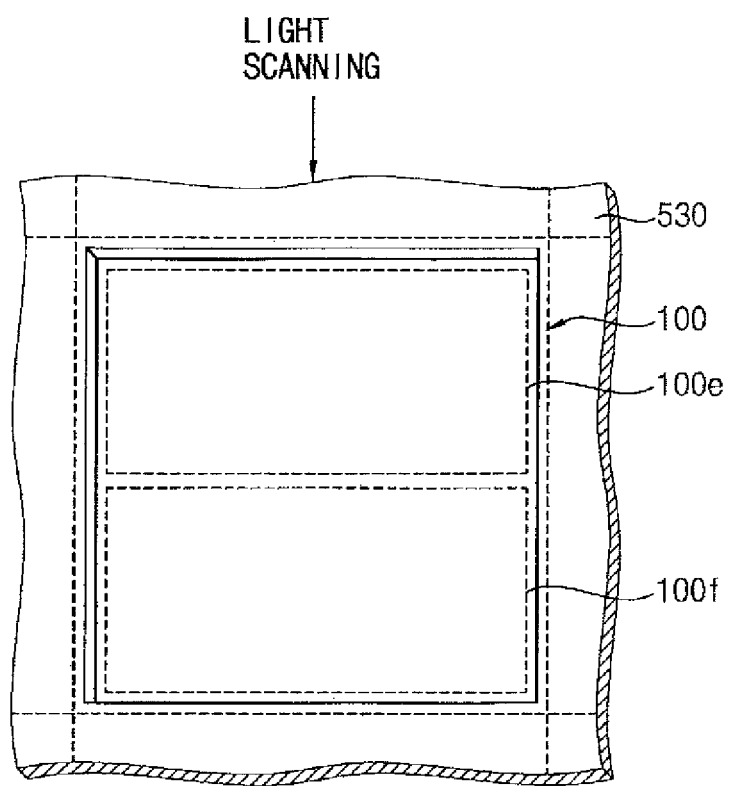

FIG. 13A and FIG. 13C are plan views illustrating a method for manufacturing the display panel in FIG. 12.

Referring to FIG. 13A and FIG. 13C, a first mask 510 and a second mask 520 are used in a method for manufacturing a display panel of the present embodiment. The first mask 510 exposes only the first domain. 100e, and the second mask 520 exposes only the second domain 100f. A third mask exposing the first and second domains 100e, 100f may be used. However, the third mask may be replaceable by scanning without any masks. A first exposed area 512, which is exposed by the first mask 510, corresponds to the first domain 100e. A second exposed area 522, which is exposed by the second mask 520, corresponds to the second domain 100f. The display panel manufactured by the method of the present embodiment is manufactured by light and areas exposed by the first mask 510 and the second mask 520. The areas exposed by the first mask 510 and the second mask 520 have different alignment directions.

Referring to FIG. 13A, the first mask 510 exposes the first domain 100e, and the light is scanned in a first direction toward the first exposed area 512, which is exposed by the first mask 510. The first direction may be, for example, substantially the same as the extension direction of the gate line. Alternatively, the first direction may be, for example, substantially the same as the extension direction of the data line. The light is scanned throughout the entire of the pixel area 100, but only the first exposed area 512 is exposed by the first mask 510. Only the first exposed area 512 has the alignment in the first direction.

Referring to FIG. 13B, the second mask 520 exposes the second domain 100f, and the light is scanned in a second direction toward the second exposed area 522, which is exposed by the second mask 520. The second direction is different from the first direction. The second direction may be, for example, substantially the opposite direction of the first direction. The light is scanned throughout the entire of the pixel area 100, but only the second exposed area 522 is exposed by the second mask 520. Only the second exposed area 522 has the alignment in the second direction.

Referring to FIG. 13C, the light is scanned in a third direction with exposing both of the first domain 100e and the second domain 100f. The third direction is, for example, substantially perpendicular to both of the first and second direction. The light is scanned throughout the entire of the pixel area 100. By the third scan, the alignment aligned at the vector sum of the first and third directions is formed in the first domain 100e, and the alignment aligned at the vector sum of the second and third directions is formed in the second domain 100f.

The first mask 510 and the second mask 520 may be formed to correspond to the first domain 100e and the second domain 100f. To form the display panel, both of the first alignment film and the second alignment film may be needed. Thus, the first mask 510 may be provided as, for example, two masks, one for the first alignment film, and one for the second alignment film. In the same way, the second mask 520 may be provided, for example, as two masks.

FIG. 14A to 14F are cross-sectional views illustrating a method for manufacturing the display panel in FIG. 12.

Figure 14A:
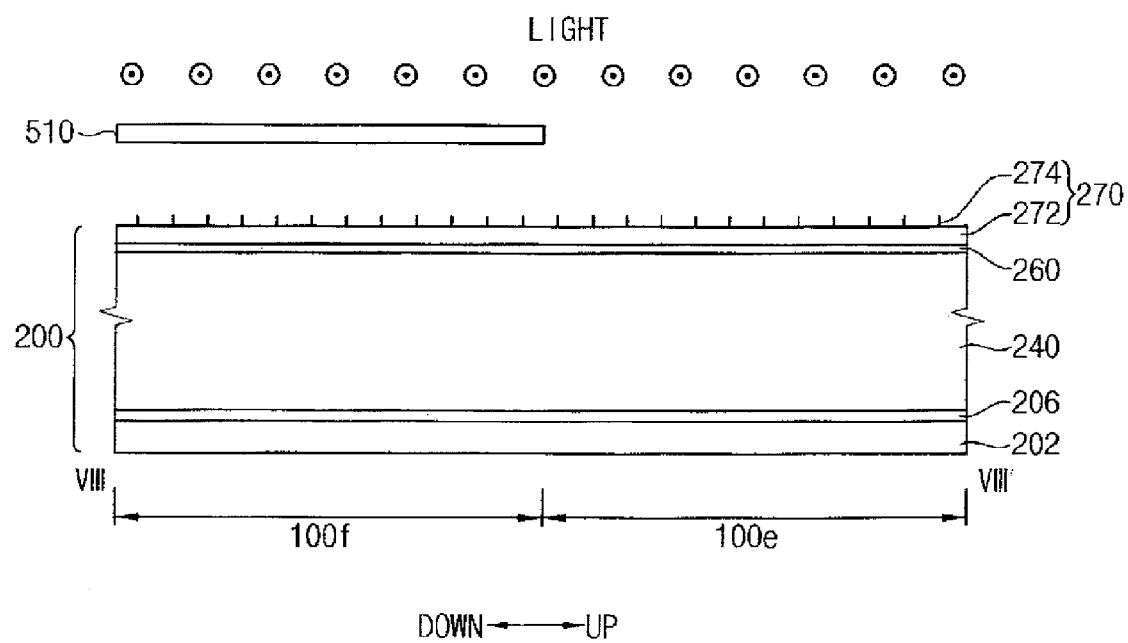
FIG. 14A to 14F are cross-sectional views illustrating a method for manufacturing the display panel in FIG. 12.
Figure 14B:
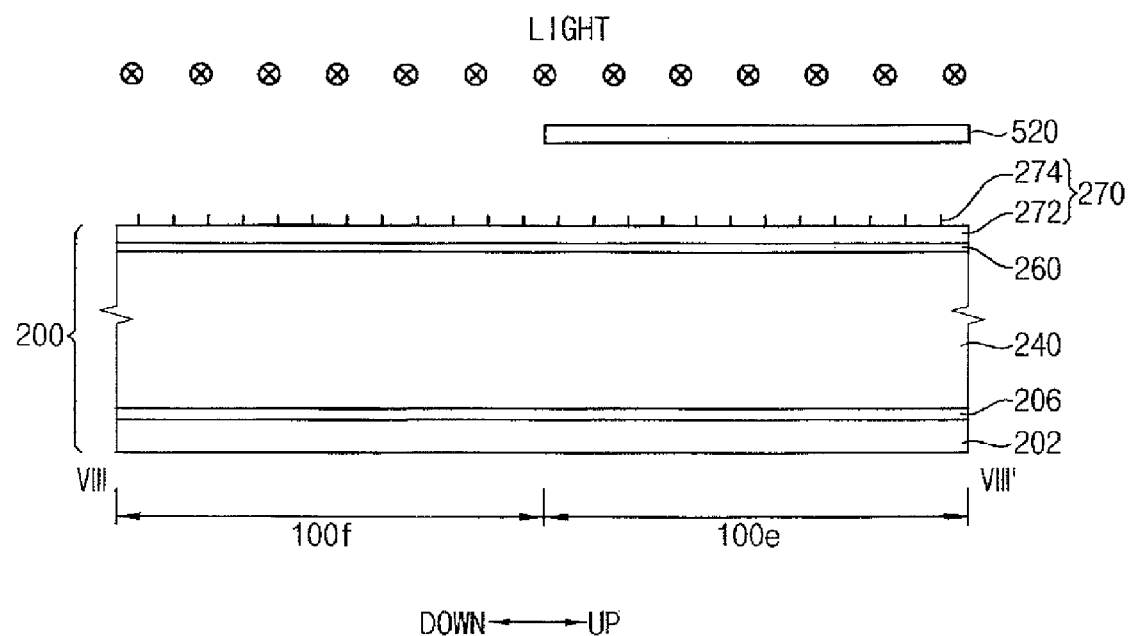
Figure 14C:
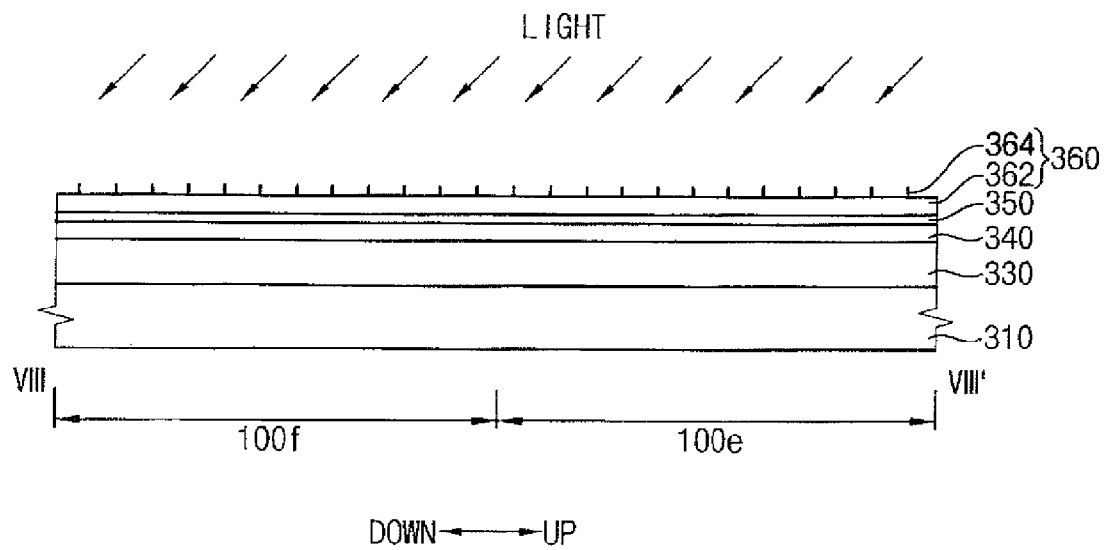

FIG. 14A and FIG. 14C are cross-sectional views illustrating a step for forming a first alignment film of a lower substrate of the display panel.

Referring to FIG. 14A, a lower substrate 200 is formed before forming the first alignment film 270. The method for forming the lower substrate 200 is substantially the same as the method described in connection with FIG. 11A. The repeated description will be omitted. The first alignment film 270 including, for example, a first domain 100e and a second domain 100f is formed on the pixel electrode 260 of the lower substrate 200. The first alignment film 270 corresponds to one pixel area. The first alignment layer 270 includes, for example, a first alignment layer 272 and a first light reactor 274. The first light reactor 274 is formed on the first alignment layer 272 and forms an inclined angle by light scanning.

The first light reactor 274 is initially formed without an alignment direction. The first light reactor 274 has the alignment direction by light scanning. The light used in forming the alignment direction may be, for example, ultraviolet light. Instead of ultraviolet light, other energy radiation such as, for example, visible light, infrared light and X rays may be used in forming the alignment direction. Alternatively, for example, in an embodiment, laser light may be used in forming the alignment direction.

The light is scanned in the first direction with the first mask 510 on the first alignment film 270. The first mask 510 exposes the first domain 100e, and blocks the second domain 100f. Thus, only the area of the first alignment film 270 corresponding to the first domain 100e has the alignment in the first direction.

Referring to FIG. 14B, the light is scanned through the first mask 510, and the light is scanned to a part of the first alignment film 270 before the light is scanned through the second mask 520.

The alignment is formed in a part of the first light reactor 274 during light scanning by the first mask 510, but, the rest of the first light reactor 274 still does not have the alignment. The alignment of the rest of the first alignment film 270 is formed by light scanning by the second mask 520. The light is scanned throughout the rest of the first alignment film 270 to form the alignment direction. The light used in forming the alignment direction may be, for example, ultraviolet light. Instead of the UV light, other energy radiation such as, for example, visible light, infrared light and X rays may be used in forming the alignment direction. Alternatively, for example, in an embodiment, laser light may be used in forming the alignment direction.

The light is scanned on the first alignment layer 270 with the second mask 520. The second direction is different from the first direction. The second direction may be, for example, substantially the opposite direction to the first direction. The second mask 520 exposes the second domain 100f and blocks the first domain 100e. Thus, the alignment is formed in the second direction at the area of the first alignment film 270 corresponding to the second domain 100f.

Referring to FIG. 14C, after scanning with the second mask 520, the light is scanned throughout the first alignment film 270 without any masks.

The first light reactor 274 has the liquid crystal alignment in first direction of the first domain 100e and in the second direction of the second domain 100f. The light is scanned through the first light reactor 274, which already has the alignment, without a mask. The light used in forming the alignment direction may be, for example, ultraviolet light. Instead of the ultraviolet light, other energy radiation such as, for example, visible light, infrared light and X rays may be used in forming the alignment direction. Alternatively, for example, in an embodiment, laser light may be used in forming the alignment direction.

The third direction is, for example, substantially perpendicular to the first direction and the second direction. Thus, the alignment aligned at the vector sum of the first and third directions is formed in the first domain 100e, and the alignment aligned at the vector sum of the second and third directions is formed in the second domain 100f.

Figure 14D:
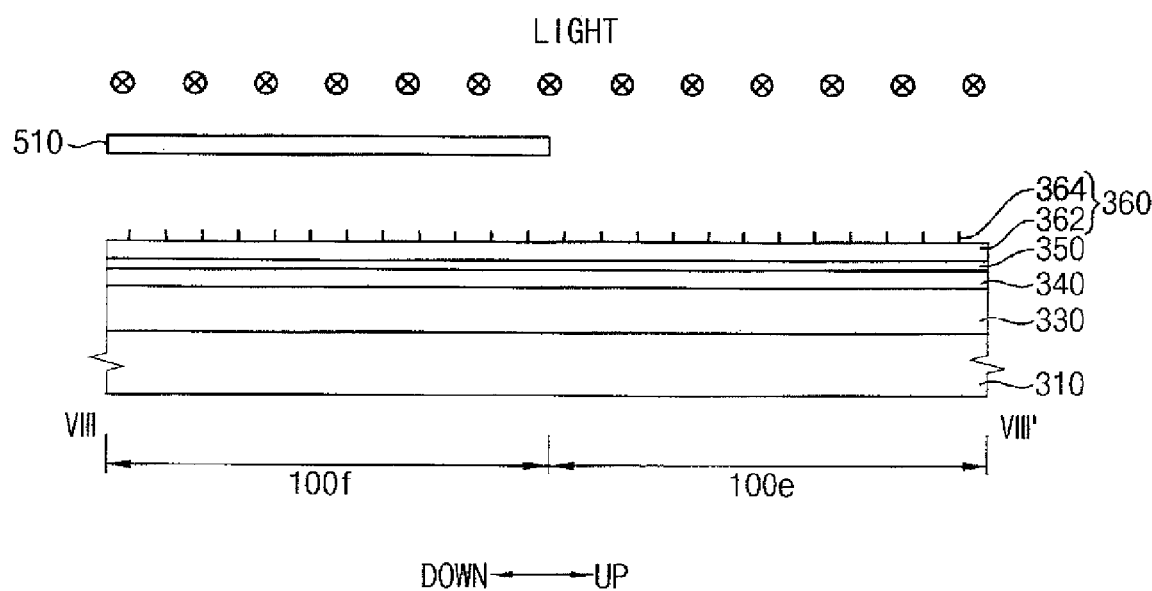
Figure 14E:
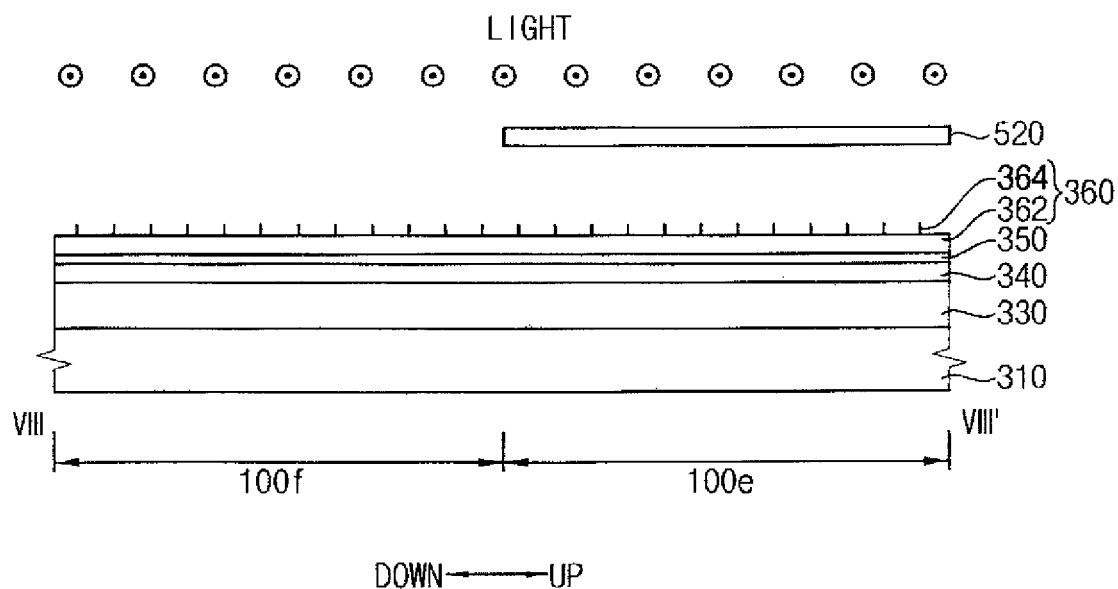
Figure 14F:
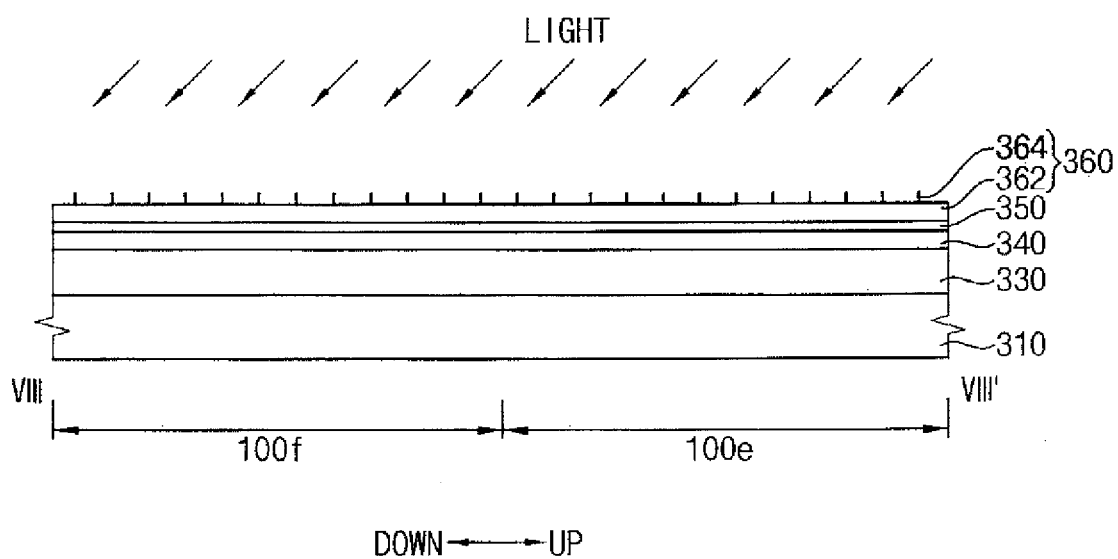

FIG. 14D and FIG. 14F are cross-sectional views illustrating a step for forming a second alignment film of an upper substrate of the display panel.

The upper substrate 300 is formed by substantially the same method as the method described in connection with FIG. 11C. The repeated description will be omitted.

Referring to FIG. 14D, the second alignment film 360 is formed on the common electrode 350 for aligning the liquid crystal of the liquid crystal layer 400. The second alignment film 360 includes, for example, a third domain 100e and a fourth domain 100f. The first domain 100e and the third domain 100e may be, for example, substantially the same area, and the second domain 100f and the fourth domain 100f may be, for example, substantially the same area. The only difference between the first and second domains 100e and 100f or the third and fourth domains 100e and 100f is where the domain implements. The first and second domains 100e and 100f are for the lower substrate 200, and the third and fourth domains 100e and 100f are for the upper substrate 300.

The second alignment film 360 includes, for example, a second alignment layer 362 and a second light reactor 364. The second light reactor 364 is formed on the second alignment layer 362 and forms an inclined angle by light scanning.

The second light reactor 362 is initially formed without an alignment direction. The second light reactor 362 has the alignment direction by light scanning. The light used in forming the alignment direction may be, for example, ultraviolet light. Instead of the ultraviolet light, other energy radiation such as, for example, visible light, infrared light and X rays may be used in forming the alignment direction. Alternatively, for, in an embodiment, laser light may be used in forming the alignment direction.

The light is scanned in the first direction with the first mask 510 on the second alignment film 360. The first direction is, for example, substantially the same direction as the scanning direction of the first alignment film with the first mask 510. The first mask 510 exposes the third domain 100e, and blocks the fourth domain 100f. Thus, only the area of the second alignment film 360 corresponding to the third domain 100e has the alignment in the first direction.

Referring to FIG. 14E, the light is scanned through the first mask 510, and the light is scanned to a part of the second alignment film 360 before the light is scanned through the second mask 520.

The alignment is formed in a part of the second light reactor 364 during light scanning by the first mask 510, but, the rest of the second light reactor 364 still does not have the alignment. The alignment of the rest of the second alignment film 360 is formed by light scanning by the second mask 520. The light is scanned throughout the rest of the second alignment film 360 to form the alignment direction. The light used in forming the alignment direction may be, for example, ultraviolet light. Instead of ultraviolet light, other energy radiation such as, for example, visible light, infrared light and X rays may be used in forming the alignment direction. Alternatively, for example, in an embodiment, laser light may be used in forming the alignment direction.

The light is scanned on the second alignment layer 360 with the second mask 520. The second direction is different from the first direction. The second direction may be, for example, substantially the opposite direction to the first direction. The second mask 520 exposes the fourth domain 100f and blocks the third domain 100e. Thus, the alignment is formed in the second direction at the area of the second alignment film 360 corresponding to the fourth domain 100f.

Referring to FIG. 14F, after scanning with the second mask 520, the light is scanned throughout the second alignment film 360 without any masks.

The second light reactor 364 has the liquid crystal alignment in first direction of the first domain 100e and in the second direction of the second domain 100f. The light is scanned through the second light reactor 364, which already has the alignment, without a mask. The light used in forming the alignment direction may be, for example, ultraviolet light. Instead of the ultraviolet light, other energy radiation such as, for example, visible light, infrared light and X rays may be used in forming the alignment direction. Alternatively, for example, in an embodiment, laser light may be used in forming the alignment direction.

The third direction is, for example, substantially perpendicular to the first direction and the second direction. Thus, the alignment aligned at the vector sum of the first and third directions is formed in the first domain 100e, and the alignment aligned at the vector sum of the second and third directions is formed in the second domain 100f.

Thus, the OCB display panel including a first domain 100e and a second domain 100f, which have different liquid crystal alignment directions from each other, in one pixel area 100, is manufactured.

Figure 15:
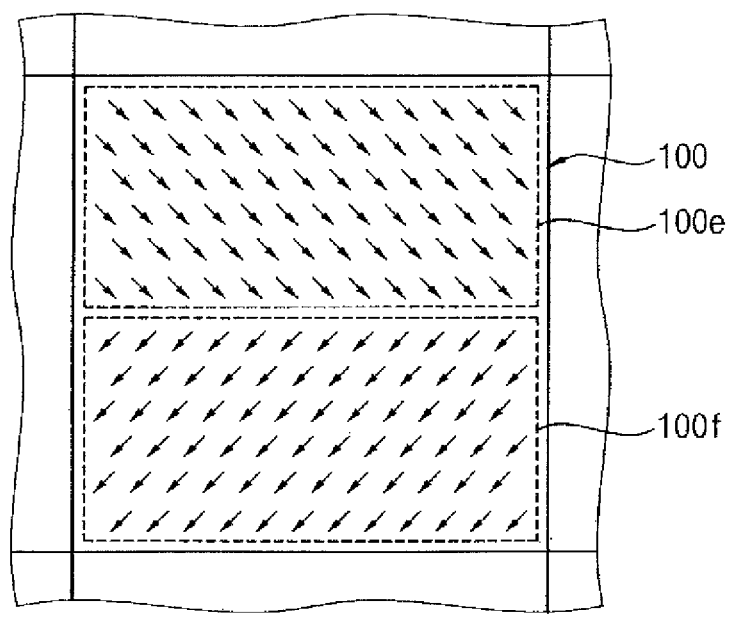
FIG. 15 is a plan view illustrating a liquid crystal alignment of the display panel in FIG. 12.

FIG. 15 is a plan view illustrating a liquid crystal alignment of the display panel in FIG. 12.

Referring to FIG. 15, a pixel area 100 of the display panel, which is manufactured by the method of the present embodiment, includes, for example, a first domain 100e and a second domain 100f. The alignment in the first domain 100e is formed in the direction, which is, for example, inclined at about 45 degrees with respect to the extension direction of the gate line. The same alignment is formed in the areas of the first alignment film and the second alignment film corresponding to the first domain 100e.

The alignment in the second domain 100f is formed in the direction, which is, for example, inclined at about 45 degrees with respect to the extension direction of the data line. The same alignment is formed in the areas of the first alignment film and the second alignment film corresponding to the second domain 100f.

According to exemplary embodiments of the present invention, one pixel area is divided into two domains, and the two domains have the different alignment directions from each other. Thus, the viewing angle and the uniformity of the color reproduction may increase.

Moreover, by three light scanning with or without masks, the alignment directions may be formed at inclined angle of about 45 degrees with respect to the gate line and the data line. Thus, a large size display apparatus may be manufactured since various polarizing sheets may be applicable.

Having described the exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A display panel comprising:
    a lower substrate including a gate line, a data line, a pixel electrode formed adjacent to the gate line and the data line on the lower substrate and a first alignment film disposed in a first domain disposed on the pixel electrode and in a second domain disposed on the pixel electrode, wherein the first domain is aligned in a first direction and the second domain is aligned in a second direction which is different from the first direction;
    an upper substrate opposing the lower substrate, wherein the upper substrate includes a common electrode disposed on the upper substrate and a second alignment film disposed on the common electrode at a third domain corresponding to the first domain and at a fourth domain corresponding to the second domain, wherein the third domain is aligned in the first direction and the fourth domain is aligned in the second direction; and
    a liquid crystal layer disposed between the lower substrate and the upper substrate, wherein the liquid crystal layer includes liquid crystals defined by a plurality of pixel areas and wherein the liquid crystals are aligned by the first alignment film and the second alignment film,
    wherein the first alignment film comprises a first alignment layer and a first light reactor disposed on the first alignment layer, the second alignment film comprises a second alignment layer and a second light reactor disposed on the second alignment layer, and alignment of the liquid crystals is set in accordance with directions of the first and second light reactors, and
    wherein the first and second light reactors are configured to have the directions thereof set in accordance with angles of incline of scanning light such that the first light reactor and the second light reactor are arranged in a substantially same direction, in a plan view, and the first light reactor and the second light reactor are symmetrically tilted with respect to each other.

2. The display panel of claim 1, wherein the first domain and the second domain correspond to a pixel area of the liquid crystal layer, and wherein the third domain and the fourth domain correspond to the pixel area of the liquid crystal layer.

3. The display panel of claim 2, wherein the pixel area of the liquid crystal layer is divided into the first domain and the second domain, wherein the first domain is disposed adjacent to the second domain, and wherein the pixel area of the liquid crystal layer is divided into the third domain and the fourth domain, and the third domain is disposed adjacent to the fourth domain.

4. The display panel of claim 2, wherein the pixel area of the liquid crystal layer is divided into the first domain and the second domain, and the first domain is disposed at a left side to the second domain, wherein the pixel area of the liquid crystal layer is divided into the third domain and the fourth domain, and wherein the third domain is disposed at a left side to the fourth domain.

5. The display panel of claim 1, wherein the second direction is substantially the opposite direction to the first direction.

6. The display panel of claim 5, wherein the first direction is substantially the same direction as an extension direction of the gate line.

7. The display panel of claim 5, wherein the first direction is substantially the same direction as an extension direction of the data line.

8. The display panel of claim 1, wherein the first direction is substantially perpendicular to the second direction.

9. The display panel of claim 8, wherein the first direction is inclined at about 45 degrees with respect to an extension direction of the gate line.

10. The display panel of claim 8, wherein the first direction is inclined at about 45 degrees with respect to an extension direction of the data line.

11. A method for manufacturing a display panel comprising:
    forming a lower substrate by forming a gate line, a data line and a pixel electrode formed adjacent to the gate line and data line on a first base substrate;
    forming a first alignment film on a first domain and a second domain of a pixel area disposed on the pixel electrode of the lower substrate, the first alignment film comprising a first alignment layer and a first light reactor disposed on the first alignment layer;
    forming alignments at the first domain in a first direction and at the second domain in a second direction which is different from the first direction by setting directions of the first light reactor in accordance with angles of incline of scanning light;
    forming an upper substrate by forming a common electrode on a second base substrate;
    forming a second alignment film on the common electrode of the upper substrate at a third domain corresponding to the first domain and at a fourth domain corresponding to the second domain, the second alignment film comprises a second alignment layer and a second light reactor disposed on the second alignment layer in accordance with angles of incline of scanning light;
    forming alignments at the third domain in the first direction and at the fourth domain in the second direction by setting directions of the second light reactor in accordance with angles of incline of scanning light; and
    forming a liquid crystal layer between the lower substrate and the upper substrate,
    wherein the first light reactor and the second light reactor are arranged in a substantially same direction, in a plan view, and the first light reactor and the second light reactor are symmetrically tilted with respect to each other.

12. The method for manufacturing of claim 11, wherein the second direction is substantially the opposite direction to the first direction.

13. The method for manufacturing of claim 12, wherein the step for forming the alignments at the first domain in a first direction and at the second domain in the second direction includes:
    scanning light on the first alignment film in the first direction by using a first mask for the lower substrate exposing the first domain; and
    scanning light on the first alignment film in the second direction by using a second mask for the lower substrate exposing the second domain.

14. The method for manufacturing of claim 12, wherein the step for forming the alignments at the third domain in the first direction and at the fourth domain in the second direction includes:
- scanning light on the second alignment film in the first direction by using a first mask for the upper substrate exposing the third domain; and
- scanning light on the second alignment film in the second direction by using a second mask for the upper substrate exposing the fourth domain.

15. The method for manufacturing of claim 12, wherein the first direction is substantially the same direction as an extension direction of the gate line.

16. The method for manufacturing of claim 12, wherein the first direction is substantially the same direction as an extension direction of the data line.

17. The method for manufacturing of claim 11, wherein the first direction is substantially perpendicular to the second direction.

18. The method for manufacturing of claim 17, wherein the step for forming the alignments at the first domain in a first direction and at the second domain in the second direction includes:
- scanning light on the first alignment film in a third direction by using a first mask for the lower substrate exposing the first domain; and
- scanning light on the first alignment film in a fourth direction which is substantially opposite to the third direction by using a second mask for the lower substrate exposing the second domain.

19. The method for manufacturing of claim 11, wherein the step for forming the alignments at the third domain in the first direction and at the fourth domain in the second direction includes:
- scanning light on the second alignment film in a third direction by using a first mask for the upper substrate exposing the third domain; and
- scanning light on the second alignment film in a fourth direction which is substantially opposite to the third direction by using a second mask for the upper substrate exposing the fourth domain.

20. The method for manufacturing of claim 17, wherein the first direction is inclined at about 45 degrees with respect to an extension direction of the gate line.

21. The method for manufacturing of claim 17, wherein the first direction is inclined at about 45 degrees with respect to an extension direction of the data line.

22. A display panel comprising:
- a lower substrate including a gate line and a data line that intersect each other on a first base substrate, a pixel electrode formed on the gate line and the data line and a first alignment film formed on the pixel electrode, wherein the first alignment film includes a first alignment layer and a first light reactor disposed on the first alignment layer, wherein the gate line and data line define a pixel area divided into a first domain aligned in a first direction and a second domain aligned in a second direction which is different from the first direction;
- an upper substrate including a second base substrate opposing the lower substrate, a common electrode formed on the second base substrate and a second alignment film formed on the common electrode, wherein the second alignment film includes a second alignment layer and a second light reactor disposed on the second alignment layer; and
- a liquid crystal layer disposed between the lower substrate and the upper substrate, wherein the liquid crystal layer includes liquid crystals that aligned by the first alignment film and the second alignment film in a first direction in the first domain of the pixel area and are aligned by the first alignment film and the second alignment film in a second direction different from the first direction in the second domain of the pixel area,
- wherein the first and second light reactors are configured to have the directions thereof set in accordance with angles of incline of scanning light such that the first light reactor and the second light reactor are arranged in a substantially same direction, in a plan view, and the first light reactor and the second light reactor are symmetrically tilted with respect to each other.

23. The display panel of claim 22, wherein the first light reactor and the second light reactor are each disposed in the first direction in the first domain of the pixel area and wherein the first direction in the first domain is substantially the same direction as an extension direction of the gate line.

24. The display panel of claim 22, wherein the first light reactor and the second light reactor are each disposed in the second direction in the second domain of the pixel area and wherein the second direction in the second domain is substantially the same direction as an extension direction of the gate line and opposite to the first direction.

25. The display panel of claim 22, wherein the first light reactor and the second light reactor are each disposed in the first direction in the first domain of the pixel area and wherein the first direction in the first domain is substantially the same direction as an extension direction of the data line.

26. The display panel of claim 22, wherein the first direction in the first domain is inclined about 45 degrees with respect to an extension direction of the gate line.

* * * * *